US008659781B2

(12) United States Patent
Murakami

(10) Patent No.: US 8,659,781 B2
(45) Date of Patent: Feb. 25, 2014

(54) MEDIUM TRANSPORTING APPARATUS AND IMAGE FORMING APPARATUS THAT EMPLOYS THE MEDIUM TRANSPORTING APPARATUS

(75) Inventor: Tatsuya Murakami, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/474,035

(22) Filed: May 17, 2012

(65) Prior Publication Data
US 2012/0224901 A1 Sep. 6, 2012

Related U.S. Application Data

(63) Continuation of application No. 12/200,038, filed on Aug. 28, 2008, now Pat. No. 8,218,194.

(30) Foreign Application Priority Data

Sep. 14, 2007 (JP) .................................. 2007-238633

(51) Int. Cl.
*G06F 15/00* (2006.01)
(52) U.S. Cl.
USPC .......................................................... 358/1.15
(58) Field of Classification Search
USPC .......................................................... 358/1.12
See application file for complete search history.

(56) References Cited

U.S. PATENT DOCUMENTS

2006/0065718 A1* 3/2006 Tsuruta .......................... 235/381
2006/0219114 A1 10/2006 Iketani

FOREIGN PATENT DOCUMENTS

JP 2004-137078 A 5/2004
JP 2005-015150 A 1/2005

* cited by examiner

*Primary Examiner* — Saeid Ebrahimi Dehkordy
(74) *Attorney, Agent, or Firm* — Panitch Schwarze Belisario & Nadel LLP

(57) ABSTRACT

A medium transporting apparatus is incorporated in an apparatus, and includes a first transport path and a second transport path. The first transport path is defined in the body of the apparatus. The second transport path is disposed on a medium cassette. The medium cassette is movable in a direction in which the medium cassette is pulled out of the apparatus and in a direction in which the medium cassette is inserted into the apparatus, so that the second transport path is detachably coupled to the first transport path. When the medium cassette has been inserted completely into the apparatus, a guide member extends to cover a joint portion between the first transport path and the second transport path, thereby facilitating advancement of the medium from the second transport path to the first transport path.

20 Claims, 24 Drawing Sheets

MEDIUM TRANSPORTING APPARATUS AND IMAGE FORMING APPARATUS THAT EMPLOYS THE MEDIUM TRANSPORTING APPARATUS

CROSS-REFERENCE TO RELATED APPLICATIONS

This application is a Continuation of U.S. patent application Ser. No. 12/200,038, filed Aug. 28, 2008, the disclosure of which is incorporated herein by reference.

BACKGROUND OF THE INVENTION

The present invention relates to a medium transporting apparatus and an image forming apparatus that employs the medium transporting apparatus.

A conventional image forming apparatus includes an image forming section and a fixing section. The image forming section forms a toner image on a photoconductive drum in accordance with image data. The toner image is transferred onto a recording medium. The recording medium is then transported to the fixing section where the toner image is fused by heat and pressure. The recording medium is then discharged by a discharge roller pair onto a stacker.

The image forming apparatus includes a sheet feeding apparatus that separates the uppermost sheet from the stack of sheets. The sheet feeding apparatus includes a feed roller, a separator pad, and an urging member that urges the separator pad against the feed roller. A guide member is disposed downstream of the feed roller. The guide member includes a base and a plurality of ribs formed on the base. The ribs have the same shape. A transport roller pair is disposed downstream of the guide member.

The conventional image forming apparatus includes a paper tray that may be attached into and detached from the apparatus for replacing or replenishing the recording medium. There may be a gap between the paper tray and the body of the image forming apparatus. When a sheet of the recording medium is fed from the paper tray, the sheet may be trapped in the gap or caught by a joint portion of the body.

BRIEF SUMMARY OF THE INVENTION

An object of the invention is to provide a medium transport apparatus that facilitates smooth transportation of the medium.

Another object is to provide a medium transport apparatus that prevents bending and buckling of a medium or damage to a medium during transportation of the medium in the image forming apparatus.

Yet another object of the invention is to provide a medium transporting apparatus including a guide member that allows a first transport path and a second transport path to overlap.

A medium transporting apparatus is incorporated in an apparatus. The medium transporting apparatus includes a first transport path and a second transport path. The first transport path is defined in the body of the apparatus. The second transport path is disposed on a medium cassette that is movable in a direction in which the medium cassette is pulled out of the apparatus, so that the second transport path is detachably coupled to the first transport path. A guide member extends to cover a joint portion between the first transport path and the second transport path. A medium is transported from the second transport path to the first transport path.

The medium transporting apparatus may be incorporated in an image forming apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

First Embodiment

Embodiments will be described in detail with reference to the accompanying drawings.

Figure 1:
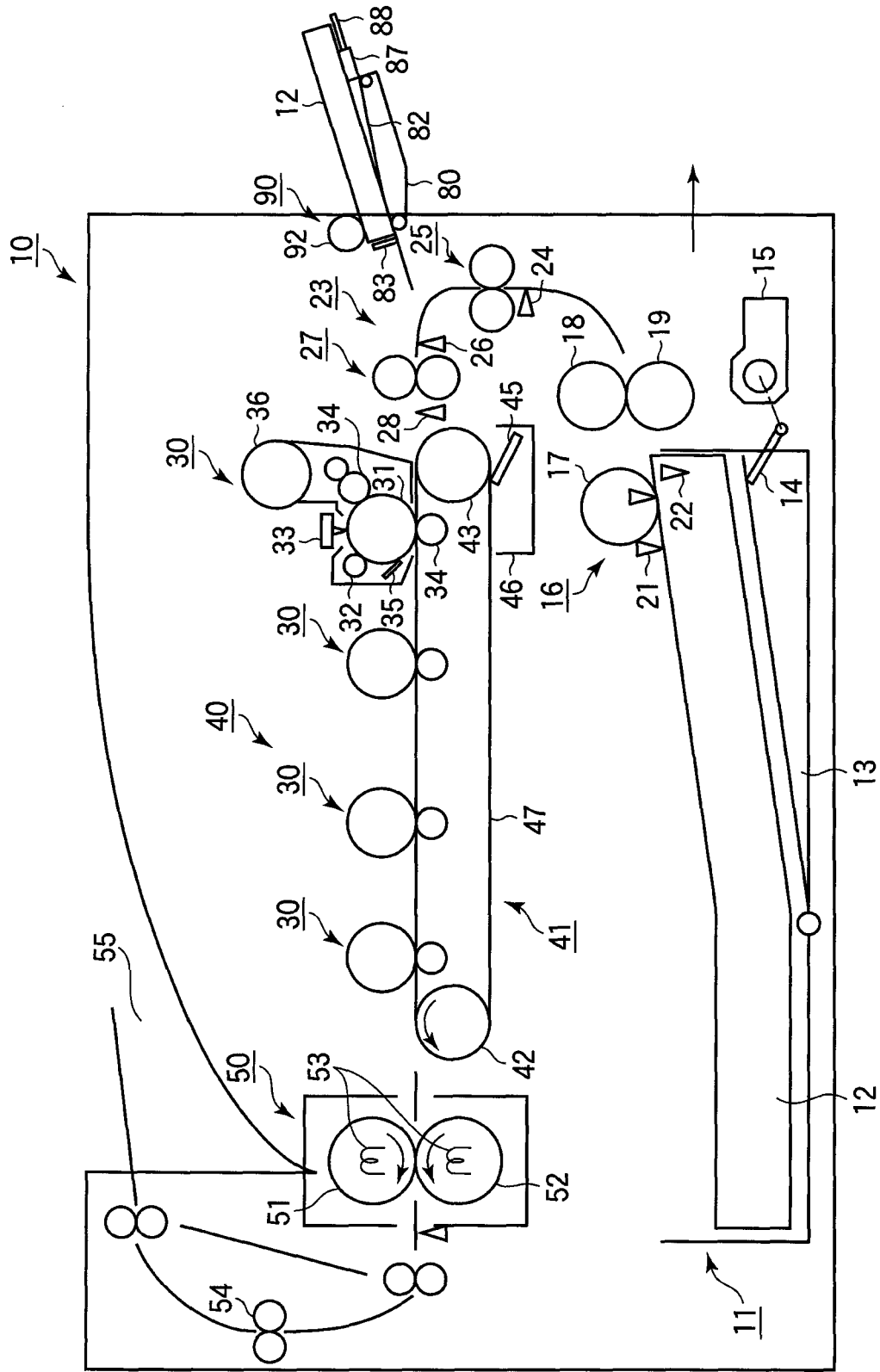
FIG. 1 illustrates a general configuration of an image forming apparatus of a first embodiment.

FIG. 1 illustrates a general configuration of an image forming apparatus 10 of a first embodiment.

Referring to FIG. 1, the image forming apparatus 10 takes the form of a multi function printer (MFP) having the functions of, for example, an electrophotographic printer, a facsimile machine, a copying machine, a printer, a multi-function printer. However, the image forming apparatus 10 may be any other form of image forming device. In this specification, the image forming apparatus 10 will be described in terms of a color electrophotographic printer. The image forming apparatus 10 includes a medium transporting apparatus that transports a medium 12 including print paper and transparencies (OHP sheet).

A paper cassette 11 is detachably attached to the image forming apparatus 10, and holds a stack of the medium 12 therein. A platform 13 is pivotally mounted to the paper cassette 11, and supports the stack of medium thereon. The paper cassette 11 includes a guide member (not shown) that restricts the position of the stack of medium in the paper cassette 11. The guide member determines the positions of the stack of medium both in the advance direction (i.e., direction in which the medium is fed out from the paper cassette 11) and in a direction perpendicular to the advance direction.

A medium feeding section 16 is disposed at an exit of the paper cassette 11 through which the medium 12 is fed out on a sheet-by-sheet basis. The medium feeding section 16 includes a pick-up roller 17, a medium sensor 21 that detects the medium 12, and a remaining medium sensor 22 that detects a remaining amount of the medium 12. A lift-up lever 14 is disposed under the platform 13 near the medium feeding section 16, and is pivotally mounted on a shaft (not shown) detachably connected to a motor 15. When the paper cassette 11 is inserted into the image forming apparatus 10, the lift-up lever 14 is coupled to the motor 15, and a controller (not shown) controls the motor 15 to drive the left-up lever 14.

When the lift-up lever 14 pivots, the free end portion of the lift-up lever 14 engages the bottom of the platform 13 to push up the platform 13, so that the stack of medium 12 is raised to the pick-up roller 17. A sensor (not shown) detects when the platform 13 is raised to a predetermined height, and then the controller causes the motor 15 to stop based on the detection signal of the sensor.

When the stack of medium 12 is elevated by the lift-up lever 14 to a predetermined height, the pick-up roller 17 becomes in pressure contact with the top page of the stack of medium in the paper cassette 11. A feed roller 18 and a retard roller 19 are disposed downstream of the pick-up roller 17. The feed roller 18 and retard roller 19 cooperate with each other to separate the top page from the medium 12, thereby feeding the medium 12 on a sheet-by-sheet basis. The sensor 21 detects the presence and absence of the medium 12 in the paper cassette 11, and the sensor 22 detects the remaining amount of medium 12 in the paper cassette 11. A retard pad may be used in place of the retard roller 19.

After having been separated by the medium feeding section 16, each sheet of medium 12 is transported to a transporting mechanism 23. The medium 12 is transported to a transport roller pair 25 past a sensor 24. The transport roller pair 25 is driven by a driver section under the controller based on the timing at which the medium 12 passes the sensor 24. The transport roller pair 25 starts to rotate a predetermined amount of time after the medium 12 passes the sensor 24 so that the leading edge of the medium 12 is pushed into the nip formed in the transport roller pair 25 to remove skew of the medium 12 relative to the transport path.

Then, the medium 12 is further transported past a sensor 26 to another transport roller pair 27. The transport roller pair 27 starts rotating at a timing at which the medium 12 passes the sensor 24, thereby transporting the medium 12 without stopping. Then, the medium 12 passes a write sensor 28 and is fed into an image forming section 40.

The image forming section 40 includes four image forming sections for forming black, yellow, magenta, and cyan toner images. A transfer section 41 transfers the toner images of the respective colors formed by the respective image forming sections onto the medium 12 by an electrostatic force. Each of the image forming sections 30 may be substantially identical; for simplicity only the operation of one of the image forming sections will be described, it being understood that the other image forming sections may work in a similar fashion.

The image forming section 30 includes a photoconductive drum 31, a charging roller 32, a LED head 33, a developing roller 34, a cleaning blade 35, and a toner supplying section 36. The charging roller 32 charges the surface of the photoconductive drum 31. The LED head 33 includes LED (light-emitting diode) arrays and illuminates the charged surface of the photoconductive drum 31 to form an electrostatic latent image. The developing roller 34 supplies the toner to the electrostatic latent image to form a toner image. The cleaning blade 35 removes residual toner remaining on the photoconductive drum 31 after transfer of the toner image onto the medium 12. The toner supplying section 36 supplies fresh toner into the image forming section 30.

A transfer belt 47 electrostatically attracts the medium 12 thereto and transports the medium 12. A drive roller 42 is driven in rotation by a driver section (not shown) to drive the transfer belt 47. a tension roller 43 cooperates with the drive roller 42 to maintain the transfer belt 47 in tension. Transfer rollers 44 extend in directions parallel to the photoconductive drums 31 and are in pressure contact with the photoconductive drums 31. A high voltage is applied to the transfer roller for transferring the toner image onto the medium 12. A cleaning blade 45 scrapes residual toner off the transfer belt 47. A toner box 46 collects the residual toner scraped by the cleaning blade 45.

The transfer belt 47 runs in synchronism with the image forming sections 30 so that the toner images of the respective colors are transferred onto the medium 12 sequentially one over the other in registration. The medium 12 is then advanced to a fixing section 50 where the toner images are fused into a full color image.

The fixing section 50 includes an upper roller 51 and a lower roller 52. The upper roller 51 incorporates a heat source or a halogen lamp 53. The upper roller 51 and lower roller 52 are in pressure contact with each other to define a fixing point therebetween. When the medium 12 passes through the fixing point, the toner images are fused by heat and pressure into a full color image. Then, the medium 12 is discharged by a discharging roller pair 54 onto a stacker 55.

The image forming apparatus 10 further includes another paper cassette 80. The paper cassette 80 has the similar functions to the paper cassette 11, and is referred to as a multi-purpose tray (MPT) or a manual feed tray. The paper cassette 80 handles a variety of types of irregular media including a thin medium, a thick medium, a narrow medium, and a long medium. The paper cassette 80 is rotatably attached to the image forming apparatus 10, and is rotated to open relative to the body of the image forming apparatus 10 when it is in use. The paper cassette 80 holds a stack of medium 12 thereon.

A platform 82 is pivotally supported on a shaft above the paper cassette 80, and supports the irregular medium 12 thereon. The paper cassette 80 includes a guide member (not shown) that restricts the position of the stack of the medium 2 on the platform 82, and determines the positions of the stack both in the advance direction (a direction of feeding of the medium) and in a direction perpendicular to the advance direction. The paper cassette 82 further includes auxiliary trays 87 and 88 for supporting a stack of long-size medium.

A mechanism 83 is disposed at an exit of the paper cassette 80, and controls the position of the medium 12 on the platform 82. The shaft is detachably coupled to a drive source (not shown).

A medium feeding section 90 is disposed at an exit of the paper cassette 80, through which the medium 12 is fed into the image forming apparatus 10 on a sheet-by-sheet basis. The medium feeding section 90 has the same functions as the medium feeding section 16. When the stack of medium 12 is elevated to a predetermined height, the pick-up roller 92 becomes in pressure contact with the top page of the stack of medium in the paper cassette 80. The medium feeding section 90 further includes a separator (not shown) that separates the medium 12 into separate, individual sheets after the medium 12 is fed out of the paper cassette. A sensor (not shown) detects the presence and absence of the medium 12 on the platform 82 and another sensor (not shown) detects the remaining amount of medium 12 in the paper cassette 80.

Each sheet of the medium 2 is transported to the transporting section 23, and is then fed into the image forming section 40 where toner images of the respective colors are transferred onto the medium 12. Then, the medium 12 is advanced to the fixing section 50.

The paper cassette 11 and medium feeding section 16 will be described in detail.

Figure 2:
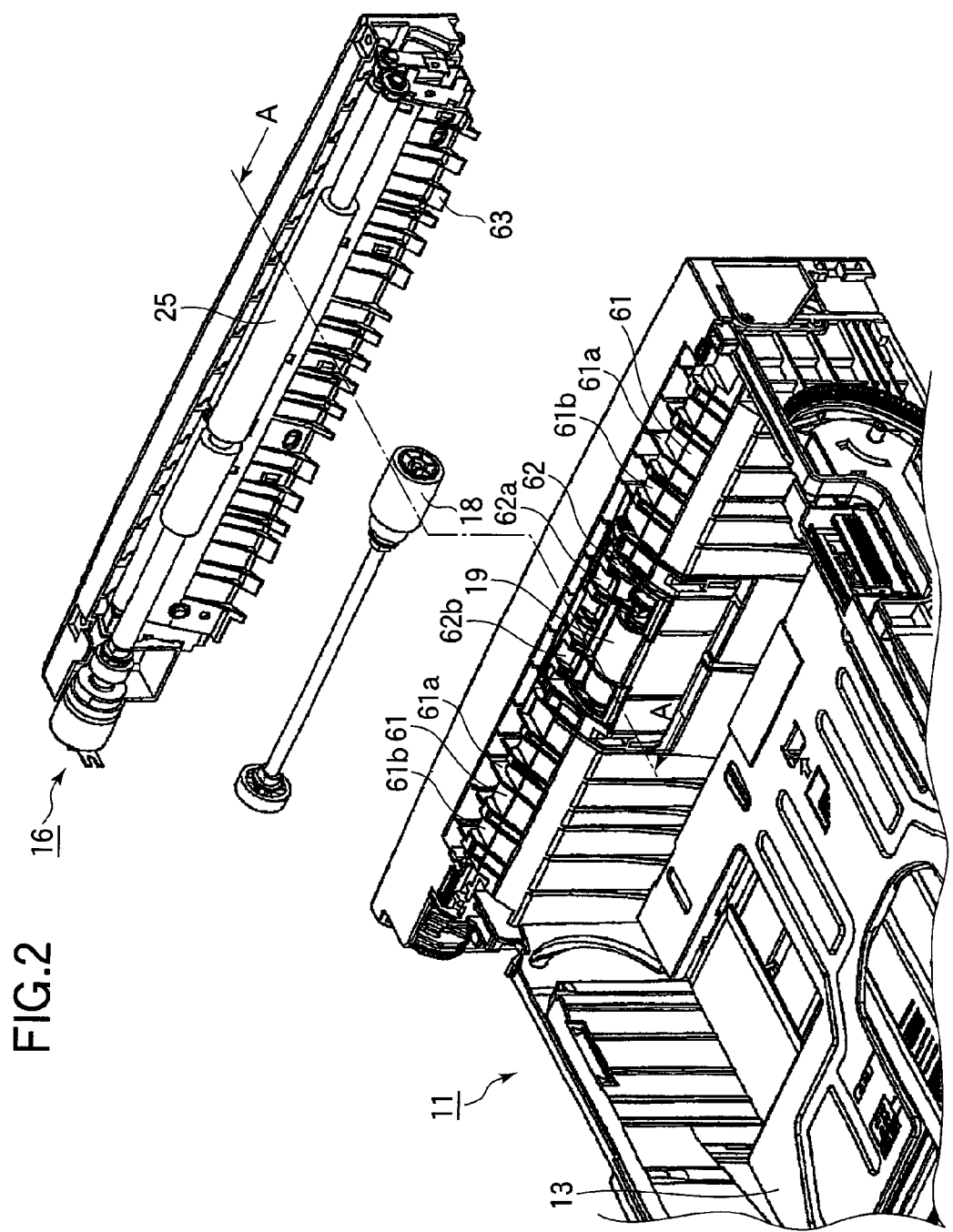
FIG. 2 is an exploded perspective view illustrating a paper cassette and a medium feeding section of the first embodiment.

FIG. 2 is an exploded perspective view illustrating the paper cassette and medium feeding section of the first embodiment.

Figure 3:
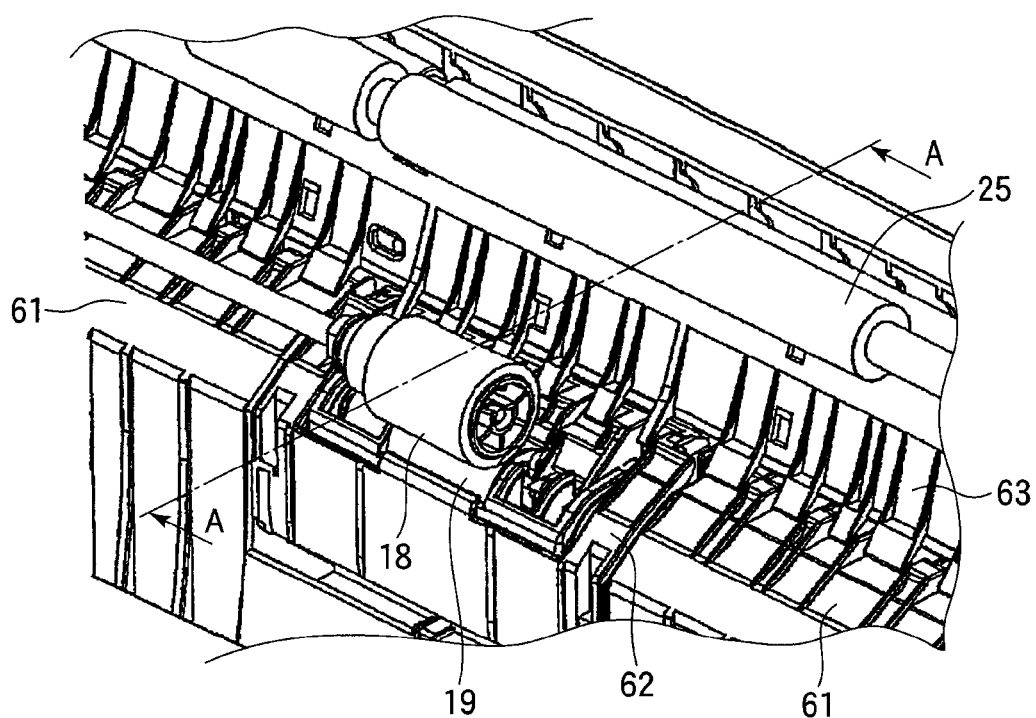
FIG. 3 is an expanded perspective view illustrating a pertinent portion of the paper cassette and medium feeding section when they have been attached into the image forming apparatus.

FIG. 3 is an expanded perspective view illustrating a pertinent portion of the paper cassette and medium feeding section when they have been attached into the image forming apparatus 10.

Figure 4:
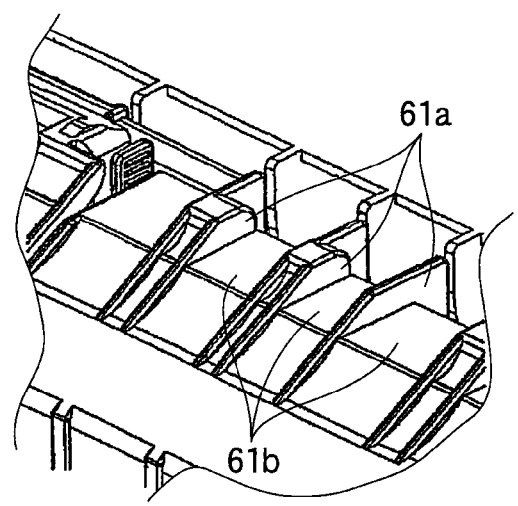
FIG. 4 is an expanded perspective view of a pertinent portion.

FIG. 4 is an expanded perspective view of a pertinent portion.

Figure 5:
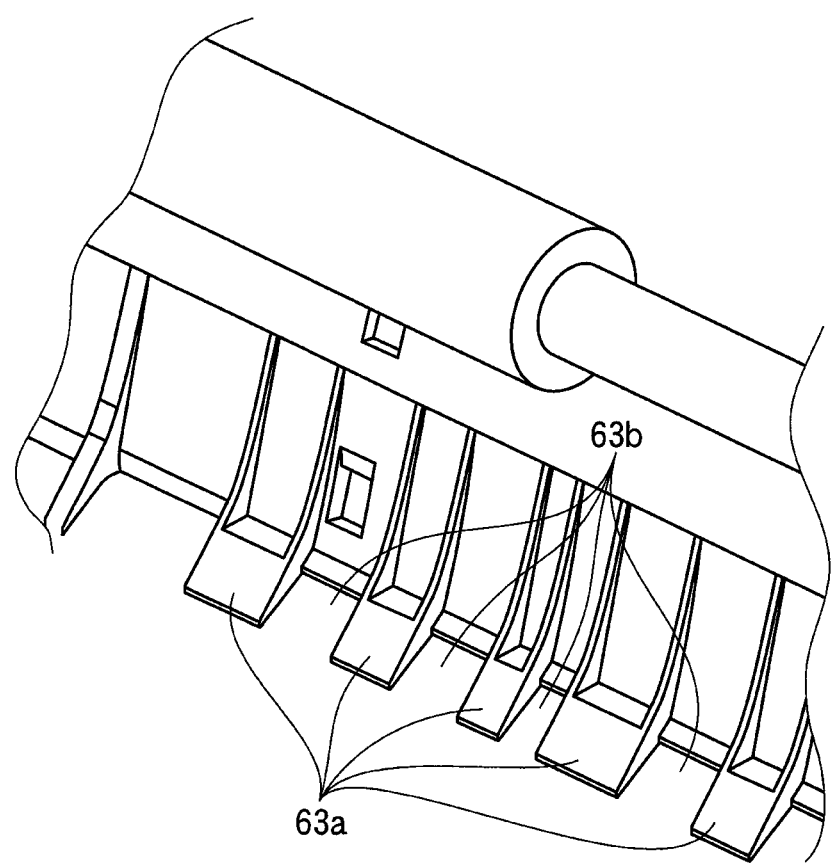
FIG. 5 is an expanded perspective view illustrating a pertinent portion of a guide member of the medium feeding section.

FIG. 5 is an expanded perspective view illustrating a pertinent portion of a guide member of the medium feeding section.

Figure 6:
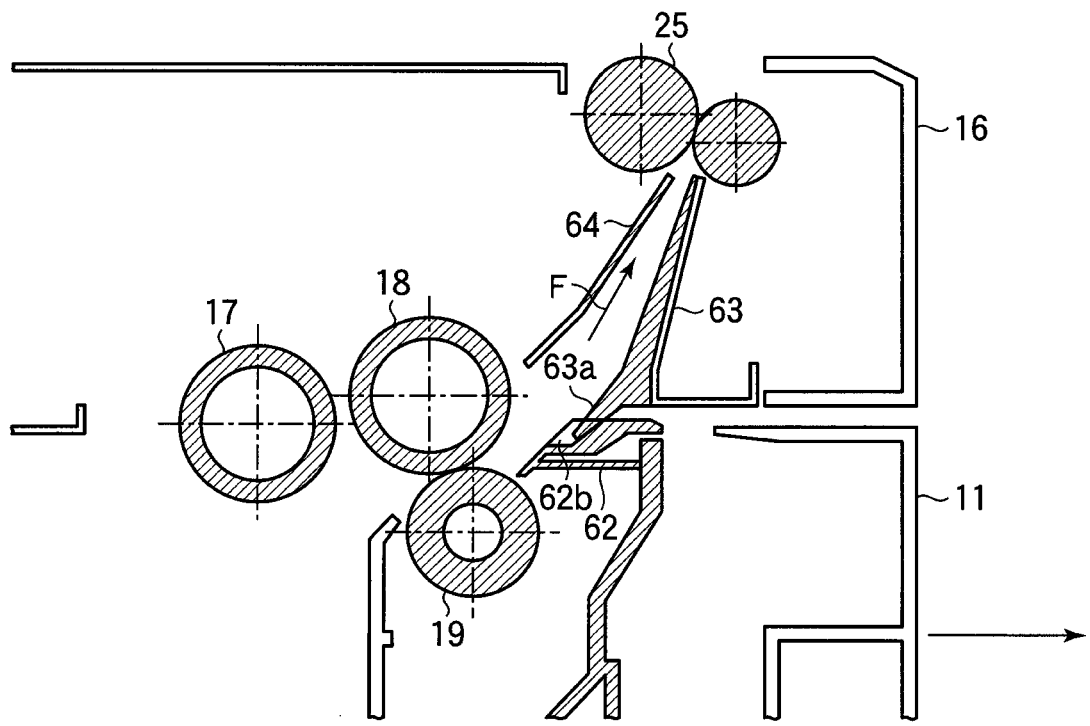
FIG. 6 is a cross-sectional view taken along a line A-A of 2 illustrating the paper cassette and medium feeding section.

FIG. 6 is a cross-sectional view taken along a line A-A of FIG. 2 illustrating the paper cassette and medium feeding section.

Referring to FIGS. 2 and 3, a guide 61 is disposed downstream of a feed roller 18, and guides the medium 12 fed by the feed roller 18. The guide member 61 is formed in the paper cassette 11. A guide 62, which is adapted to open and close, may be disposed in the paper cassette 11 in order to facilitate maintenance of the retard roller 19. The guide member 61 includes a plurality of ribs 61a formed at appropriate intervals. The guide member 62 includes a plurality of ribs 62a formed at appropriate intervals.

The guide member 61 will be described in more detail with reference to FIG. 4. Adjacent ribs 61a define a recess 61b between them. Likewise, adjacent ribs 62a define a recess 62b between them.

A guide member 63 is disposed on the medium feeding section 16, and guides travel of the medium 12 after the medium 12 has been advanced from the paper cassette 11. The guide member 63 includes peaks and valleys substantially in the shape of comb-like fingers. When the paper cassette 11 has been attached to the medium feeding section 16 completely, projections 63a of the guide 63 are adjacent to and interdigitated between ribs 61a and 62a (i.e., projections 63a are received in the recesses 61b and 62b), and such that the guide members 61 and 62 are upstream of the guide member 63 with respect to travel of the medium 12. The guide members 61 and 62 and the guide member 63 are on the same side of the medium 12 that is traveling along the transport path, and the guide members 61 and 62 upstream of the guide member 63 are closer to the medium 12 than the guide member 63.

Referring to FIG. 6, the guide member 63 and guide member 64 are arranged to oppose each other, defining a transport path F therebetween. A transport roller 25 is disposed downstream of the transport path F. The medium feeding section 16 and the paper cassette 11 are positioned such that the free ends of projections 61a and 62a are closer to a longitudinal middle of the transport path of the medium than the free ends of the projections 63a, i.e., the projections 61a and 62a are closer to the medium than the free ends of the projections 63a, so that the medium is not caught by the joint portions of the medium feeding section 16 and the paper cassette 11 when the medium passes by the overlapping portions.

The operation of the medium transporting apparatus of the aforementioned configuration will be described.

Figure 7:
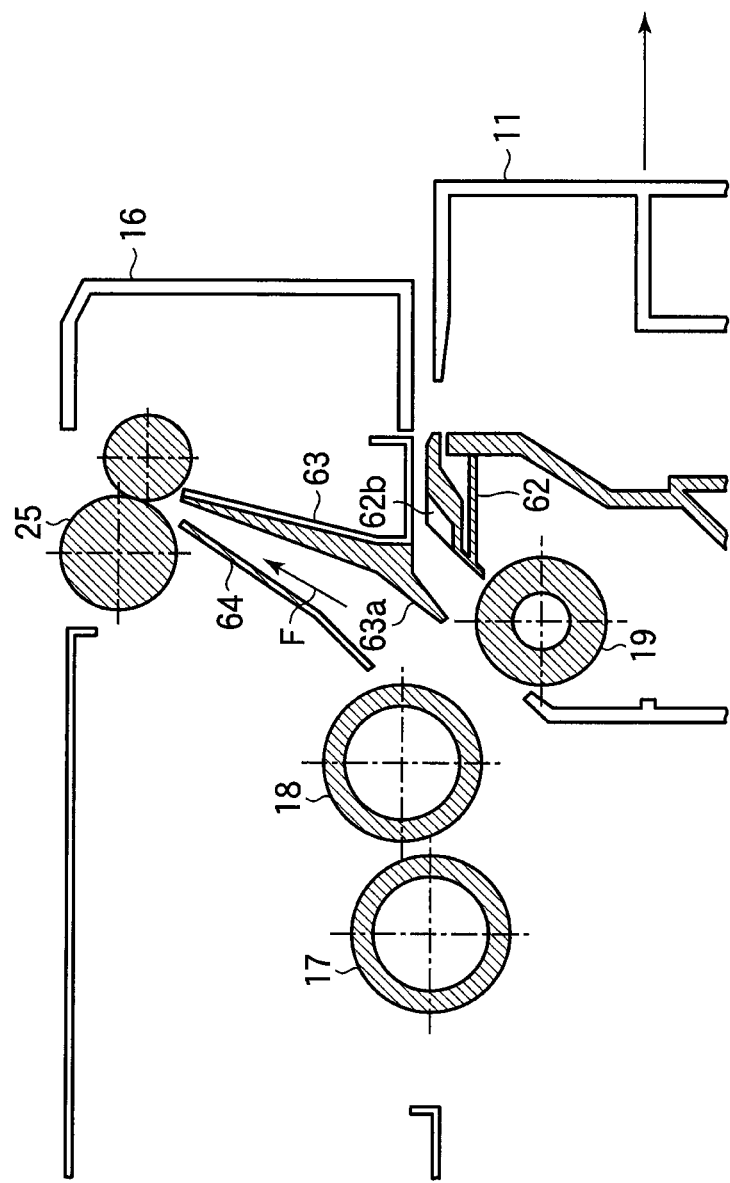
FIG. 7 is a cross-sectional view illustrating the paper cassette and medium feeding section.
Figure 8:
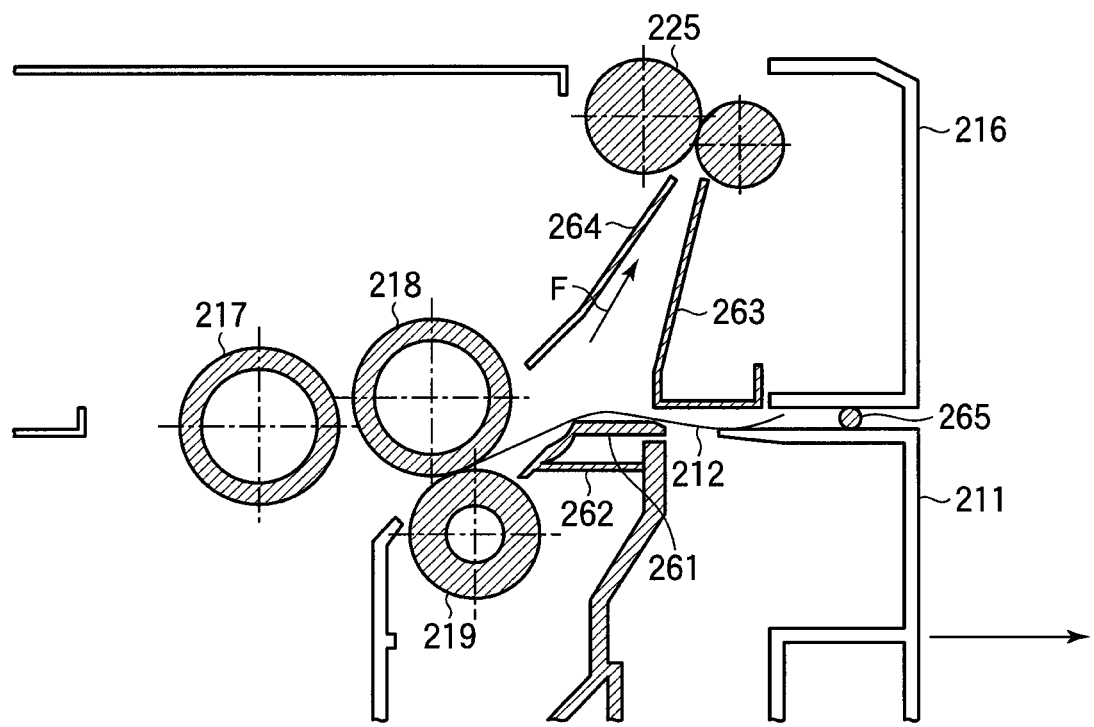
FIG. 8 illustrates the movement of a medium in a conventional apparatus.
Figure 9:
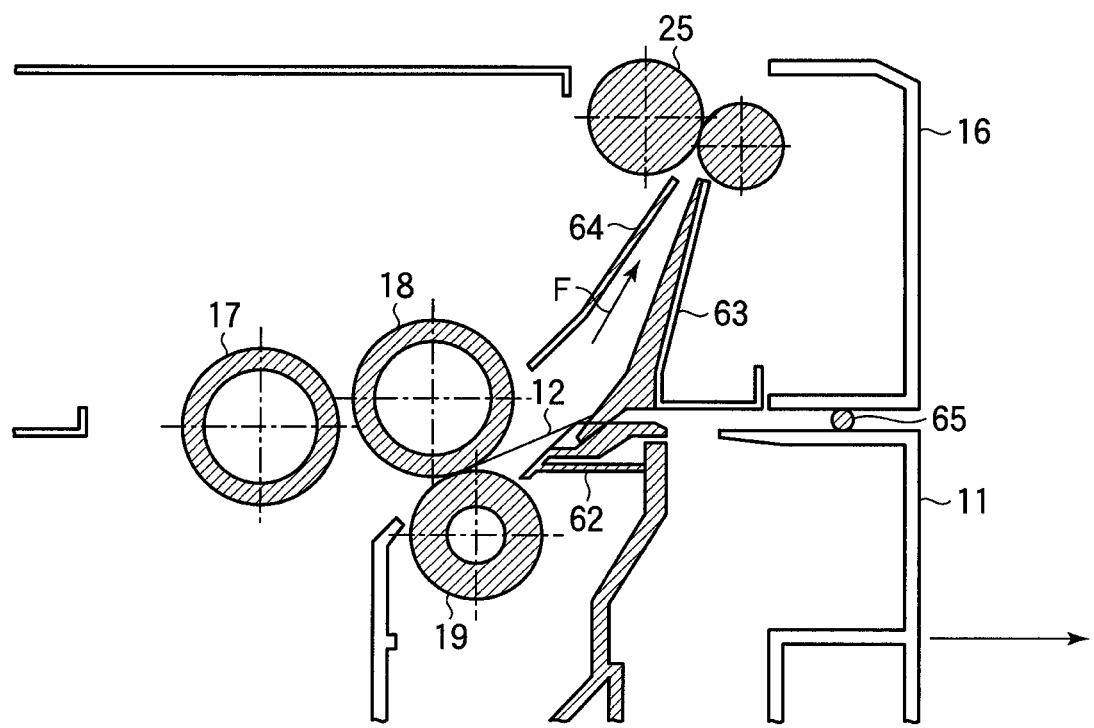
FIG. 9 illustrates the movement of the medium of the first embodiment.

FIG. 7 is a cross-sectional view illustrating the paper cassette and medium feeding section. FIG. 8 illustrates the movement of the medium 12 in a conventional apparatus. FIG. 9 illustrates the movement of the medium 12 of the embodiment.

The medium 12 advances from the paper cassette 11 substantially in a direction in which the paper cassette 11 is pulled out of the image forming apparatus 10.

It is to be noted that the projections 63a of the guide member 63 do not project into a path in which the paper cassette 11 is drawn out of the image forming apparatus. Thus, when the paper cassette 11 is drawn out or inserted into the image forming apparatus, the guide member 63 does not interfere with the paper cassette 11. Once the paper cassette 11 has been set to the medium feeding section 16, the projections 63a of the guide member 63 fit into recesses 61b and 62b, the projections 63a and recesses 61b and 62b generally extending and overlapping each other to define a path of the medium 12 along the direction of travel of the medium.

A paper feed motor (not shown) drives the pick-up roller 17 in rotation at a constant speed. When the medium 12 passes the gap between the feed roller 18 and the retard roller 19 in contact with the feed roller 18, the feed roller 18 and the retard roller 19 cooperate with each other to separate the uppermost sheet from the stack of media. Thus, the top sheet of the stack of medium placed on the platform 13 is advanced from the paper cassette 11.

In the first embodiment, the paper cassette 11 is adapted to move into and out of the medium feeding section 16. Referring to FIG. 9, there is a joint portion 65 between the medium feeding section 16 and the paper cassette 11. The medium 12 is advanced by the feed roller 18 generally in a direction perpendicular to the rotational axes of the feed roller 18 and retard roller 19, and is then advanced in a direction tangent to the feed roller 18 and the partially cylindrical surface of the guide members 61 and 62. Then, the medium 12 abuts the guide member 63 and is then guided along the guide member 63 to the transport roller pair 25.

If the projections 63a of the guide member 63 do not overlap the guide members 61 and 62 (FIG. 8), a paper jam tends to occur or the medium 12 may enter a joint portion between the paper cassette 211 and medium feeding section 216. This is true when paper is advanced in the direction tangent to the feed roller 18 and the partially cylindrical surface of the guide members 61 and 62 while the cross direction of the paper being substantially parallel to the direction of travel of the paper.

As described above, the guide member 63 includes projections 63a that project from the guide member 63, the projections 63a resembling comb fingers. The guide members 61 and 62 include recesses 61b and 62b, respectively. The projections 63a are received in the recesses 61b or 62b such that the guide members 61 and 62 are upstream of the guide member 63 with respect to travel of the medium 12. The guide members 61 and 62 and the guide member 63 are on the same side of the medium 12 traveling along the transport path, and the guide members 61 and 62 upstream of the guide member 63 are closer to the medium 12 than the guide member 63. Thus, the joint portion between the guide member 63 and guide members 61 and 62 is hidden, allowing the medium to smoothly travel along the transport path F. This structure is effective in preventing the bending and buckling of and damage to the medium 12, and improves the ability of the medium feeding section to handle the medium.

Second Embodiment

Elements similar to those of the first embodiment have given the same reference numerals and their description is omitted. The description of the operations and advantages of the same elements as the first embodiment is also omitted.

Figure 10:
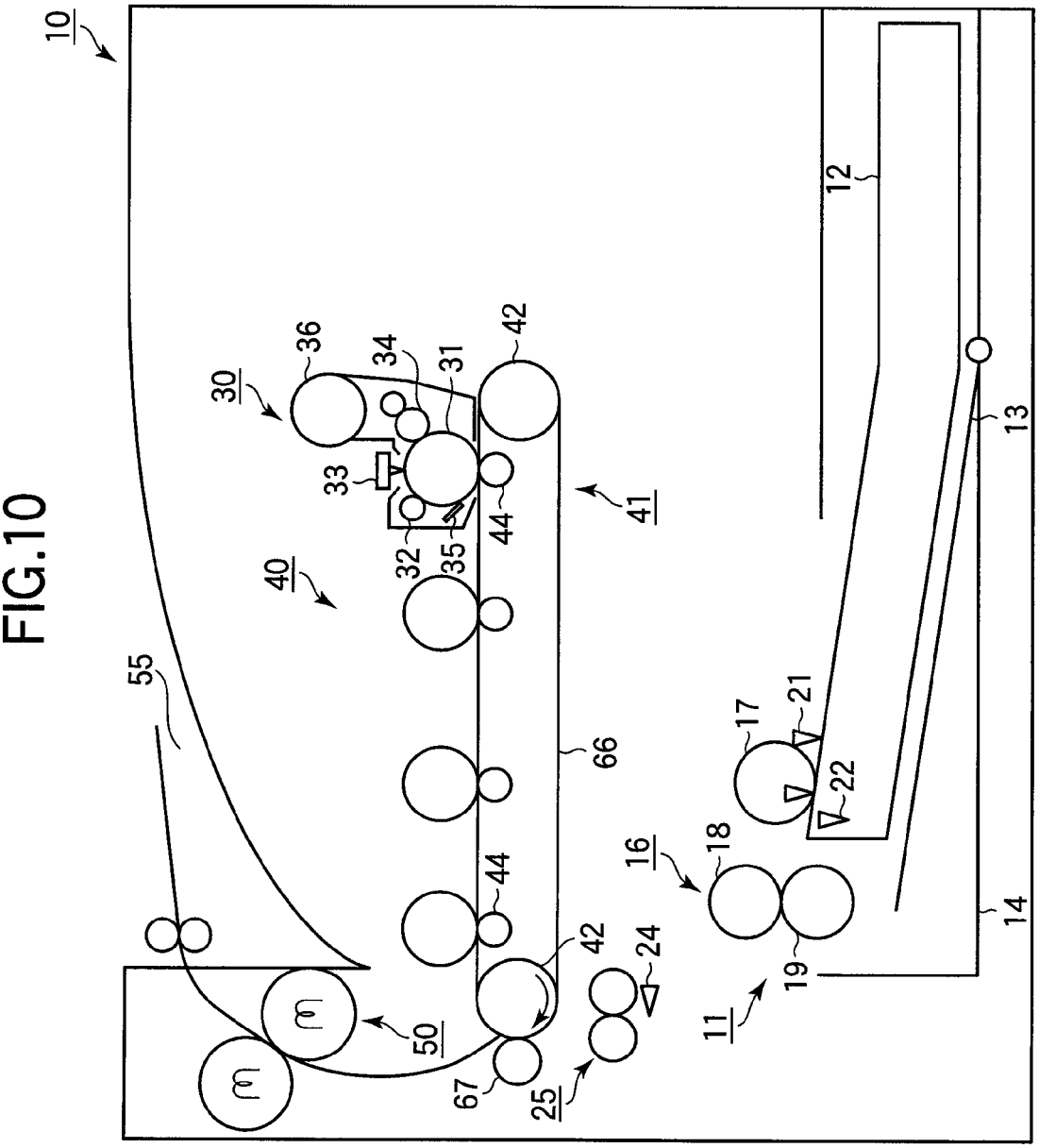
FIG. 10 illustrates the general configuration of an image forming apparatus of a second embodiment.

FIG. 10 illustrates the general configuration of an image forming apparatus 10 of a second embodiment.

The image forming apparatus 10 of the second embodiment takes the form of either an intermediate transfer type electrophotographic printer, and employs a so-called rear transporting method in which a transport path of the medium is disposed at a rear portion of the image forming apparatus 10.

Referring to FIG. 10, an image is transferred from a photoconductive drum 31 onto an intermediate transfer belt 66. The intermediate transfer belt 66 is disposed about a drive roller 42 and a tension roller 43. A drive source (not shown) drives the drive roller 42 in rotation, thereby causing the intermediate transfer belt 66 to run. A tension roller 43 cooperates with the drive roller 42 to maintain the intermediate transfer belt in tension. A transfer roller 44 parallels a photoconductive drum 31, and rotates in contact with the photoconductive drum 31, thereby transferring a toner image onto the intermediate transfer belt. A high voltage is applied to a secondary transfer roller 67 which in turn transfers the toner image from the intermediate transfer belt 66 onto the medium 12. Elements 42-44, 66, and 67 constitute a transfer section 41. The transfer section 41 further includes an attraction roller, a cleaning blade, and a toner box, which are all not shown. After the image has been transferred from the intermediate transfer belt 66 onto the medium 12, the residual toner remaining on the intermediate transfer belt 66 is transferred onto the attraction roller. The cleaning blade scrapes the toner off the attraction roller for collecting the residual toner into the toner box.

The intermediate transfer belt 66 runs in timed relation with the image forming section 30, so that images of the respective colors are transferred onto the intermediate transfer belt 66 one over the other in registration. After the toner images have been transferred from the intermediate transfer belt 66 onto the medium 12, the medium 12 advances to a fixing section 50 where the toner images are fused by heat and pressure.

The medium transporting apparatus of the second embodiment will be described in detail.

Figure 11:
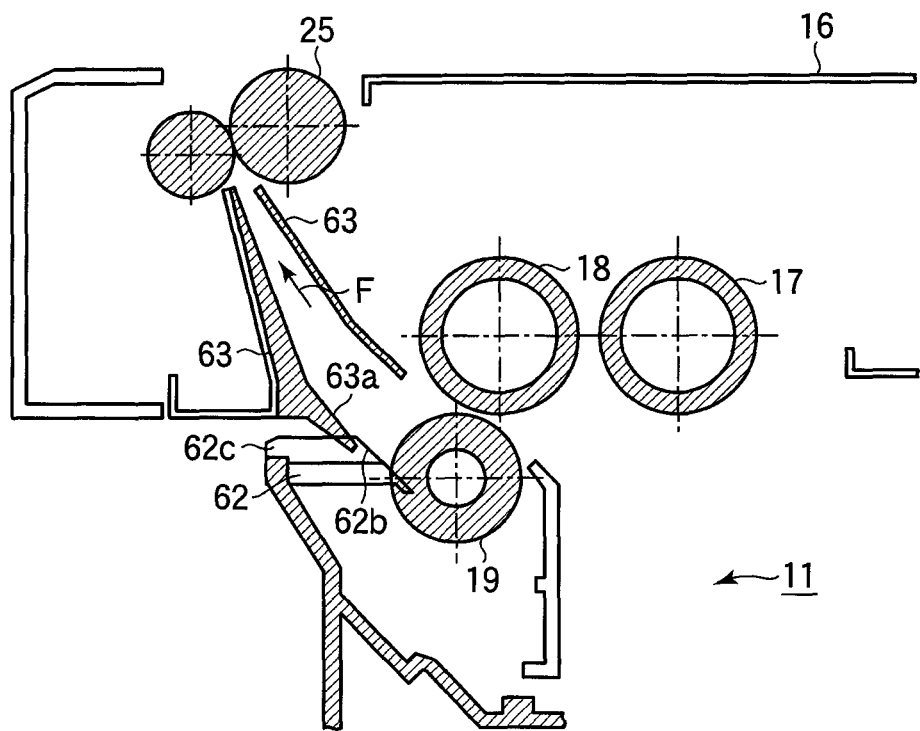
FIG. 11 is a cross-sectional view illustrating a paper cassette and a medium feeding section of the second embodiment.

FIG. 11 is a cross-sectional view illustrating a paper cassette and a medium feeding section of the second embodiment.

Figure 12:
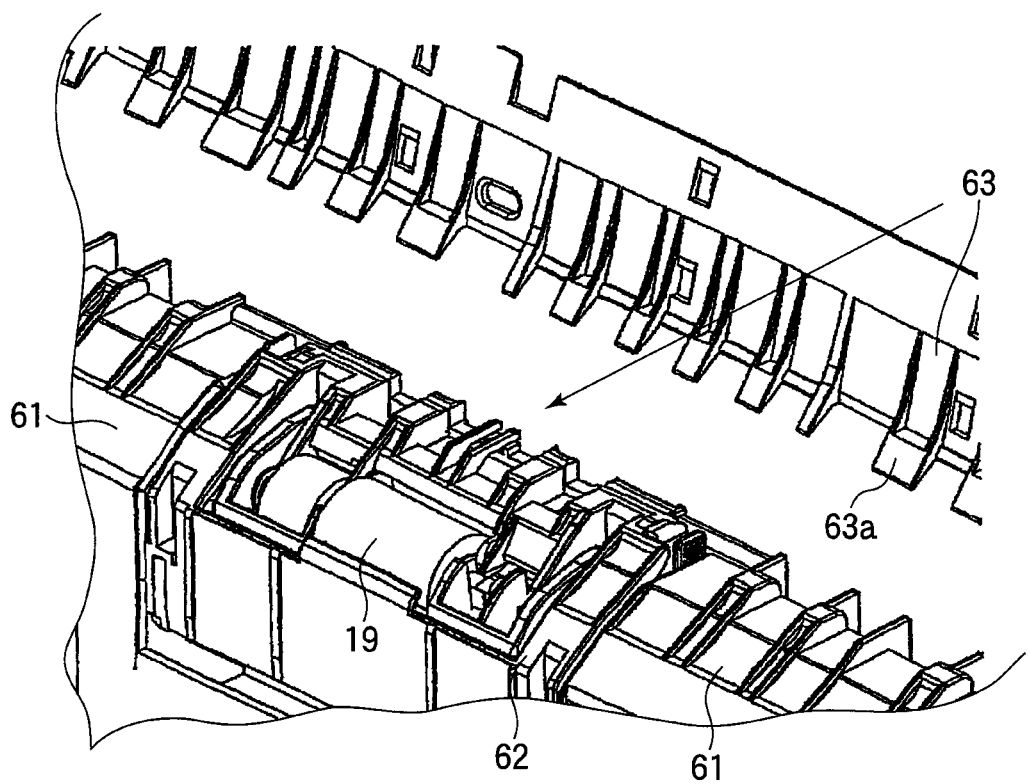
FIG. 12 is an exploded perspective view of a pertinent portion illustrating the paper cassette and medium feeding section of the second embodiment.

FIG. 12 is an exploded perspective view of a pertinent portion illustrating the paper cassette and medium feeding section of the second embodiment.

Figure 13:
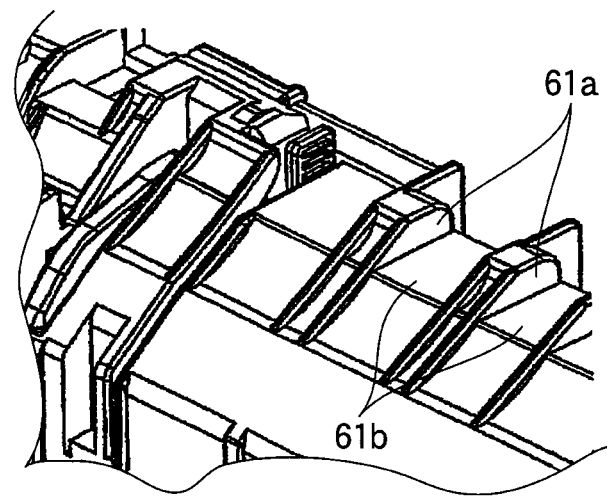
FIG. 13 is an expanded perspective view illustrating a pertinent portion of a guide member of the paper cassette.

FIG. 13 is an expanded perspective view illustrating a pertinent portion of a guide member of the paper cassette.

Figure 14:
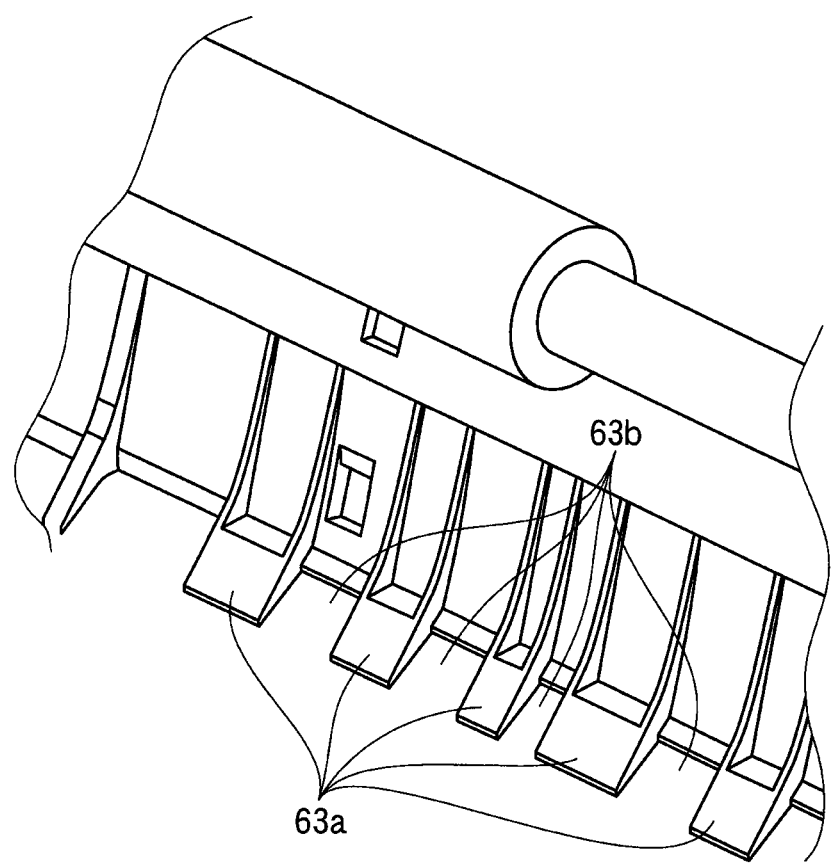
FIG. 14 is an expanded perspective view illustrating a pertinent portion of a guide member of the medium feeding section.

FIG. 14 is an expanded perspective view illustrating a pertinent portion of a guide member on the medium feeding section.

A guide member 61 is disposed downstream of a feed roller 18, and guides the medium 12 transported by the feed roller 18. The guide member 61 is formed on the paper cassette 11. A guide member 62 may be adapted to open and close relative to the body of the image forming apparatus 10, and may be provided on the paper cassette 11 for the purpose of improving maintenance efficiency of a retard roller 19. The guide member 61 includes a plurality of ribs 61a formed at appropriate intervals. The guide member 62 includes a plurality of ribs 62a formed at appropriate intervals.

The guide member 61 shown in FIG. 13 will be described in detail. The guide member 61 shown in FIG. 4 will be described in more detail. Adjacent ribs 61a define a recess 61b between them. Likewise, adjacent ribs 62a define a recess 62b between them.

A guide member 63 is disposed on the medium feeding section 16, and guides travel of the medium 12 after the medium 12 has been advanced from the paper cassette 11. The guide member 63 includes projections 63a that resemble comb-like fingers. When the paper cassette 11 has been attached to the medium feeding section 16 completely, the guide members 61 and 62 cooperatively engage each other such that the projections 63a of the guide 63 are received in the recesses 61b and 62b, and such that the guide members 61 and 62 are upstream of the guide member 63 with respect to travel of the medium 12. The guide members 61 and 62 and the guide member 63 are on the same side of the medium 12 that is traveling along the transport path, and the guide members 61 and 62 upstream of the guide member 63 are closer to the medium 12 than the guide member 63.

Referring to FIG. 11, the guide member 63 and guide member 64 are disposed to oppose each other to define a transport path F therebetween. A transport roller 25 is disposed downstream of the transport path F. The medium feeding section 16 and the paper cassette 11 are positioned such that the free ends of projections 61a and 62a are closer to a longitudinal middle of the transport path of the medium than the free ends of the projections 63a, i.e., the projections 61a and 62a are closer to the medium than the free ends of the projections 63a, so that the medium is not caught by the joint portions of the medium feeding section 16 and the paper cassette 11 when the medium passes by the overlapping portions.

The remaining portions of the configuration of the second embodiment are the same as those of the first embodiment, and their description is omitted.

The operation of the medium transporting apparatus will be described.

Figure 15:
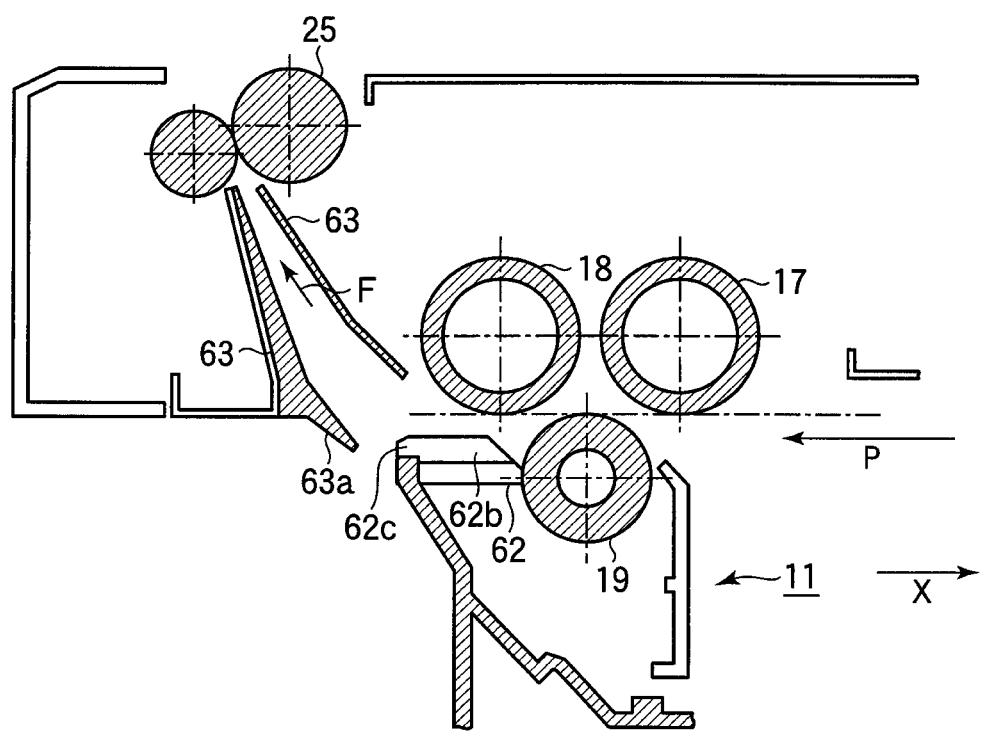
FIG. 15 is a cross-sectional view illustrating the paper cassette and the medium feeding section when the paper cassette has been drawn out from the image forming apparatus.

FIG. 15 is a cross-sectional view illustrating the paper cassette 11 and the medium feeding section 16 when the paper cassette has been drawn out from the image forming apparatus 10.

The paper cassette 11 is pulled out in a direction shown by arrow X, which is opposite to a direction shown by arrow P in which the medium 12 exits the paper cassette 11.

It is to be noted that a cutout 62c are formed in the guide member 62 at its upper end portion as shown in FIGS. 11 and 15. Therefore, when the paper cassette 11 is inserted into or pulled out of the image forming apparatus 10, the projections 63a of the guide member 63 pass through the cutout 62c not interfering with the guide member 62. Once the paper cassette 11 has been set to the medium feeding section 16, the projections 63a of the guide member 63 fit into recesses 61b and 62b, the projections 63a and recesses 61b and 62b generally extending and overlapping each other to define a path of the medium 12 for the medium 12 to advance.

As described above, even if the image forming apparatus 10 of the second embodiment takes the form of either an intermediate transfer type electrophotogrpahic printer or a monochrome electrophotographic printer, the medium 12 may be transported smoothly. In other words, when the paper cassette 11 has been attached to the medium feeding section 16 completely, the guide member 63 and the guide members 61 and 62 cooperatively engage each other such that projections 63a of the guide member 63 are received in the recesses 61b and 62b of the guide members 61 and 62, and such that the guide members 61 and 62 are upstream of the guide member 63 with respect to travel of the medium 12. The guide members 61 and 62 and the guide member 63 are on the same side of the medium 12 that is traveling along the transport path, and the guide members 61 and 62 are upstream of the guide member 63 and closer to the medium 12 than the guide member 63.

Thus, the joint portion between the guide member 63 and guide members 61 and 62 is hidden, allowing the medium to smoothly travel along the guide surfaces of the transport path F. This structure is effective in preventing the bending and buckling of the medium 12 and in protecting the medium from damage, and improves the ability of the medium feeding section 16 to handle the medium.

Third Embodiment

Elements similar to those of the first and second embodiments haven given the same reference numerals and their description is omitted. The description of the operations and advantages of the same elements as the first and second embodiments is also omitted.

Figure 16:
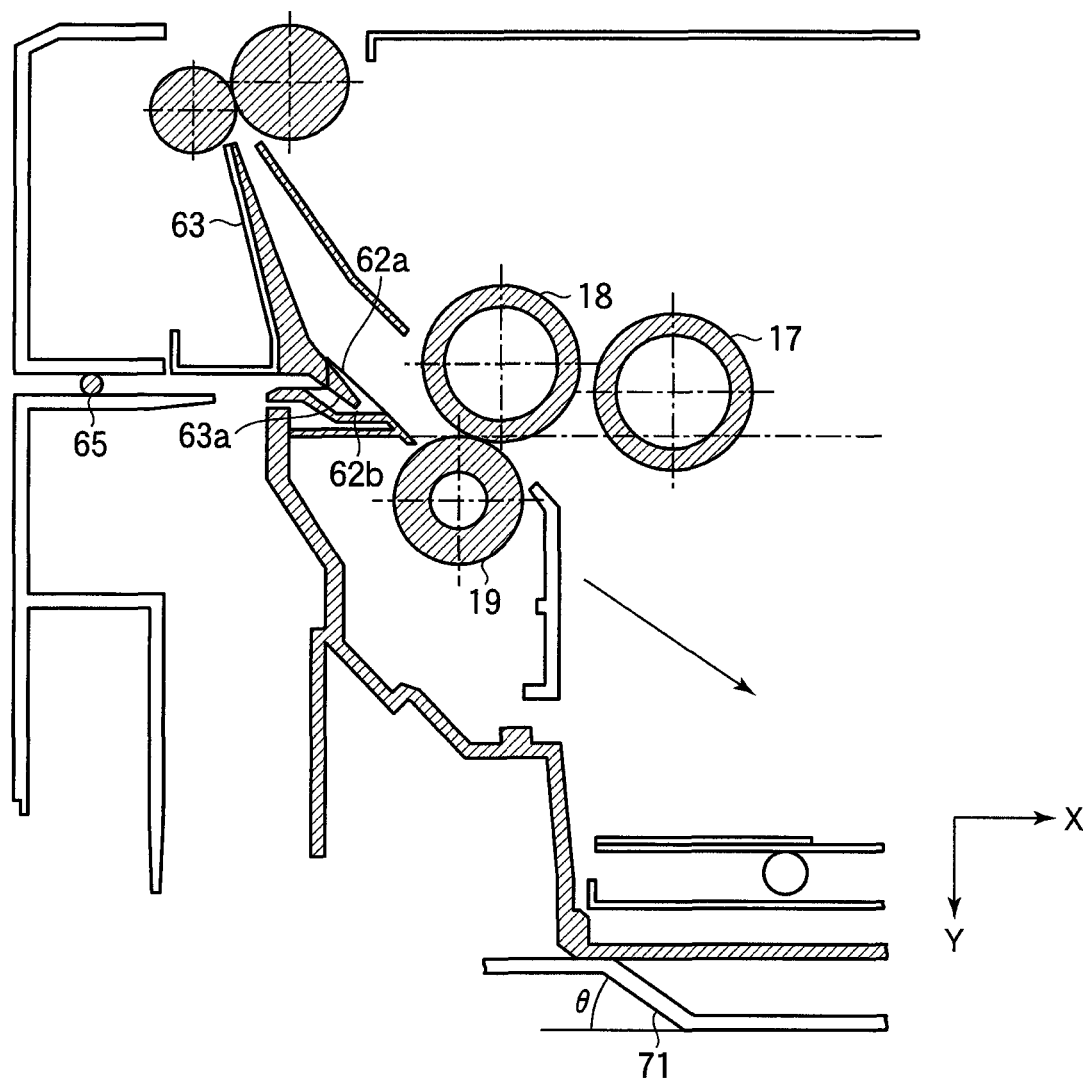
FIG. 16 is a cross-sectional view illustrating a paper cassette and a medium feeding section of a third embodiment.

FIG. 16 is a cross-sectional view illustrating a paper cassette 11 and a medium feeding section 16 of a third embodiment.

Figure 17:
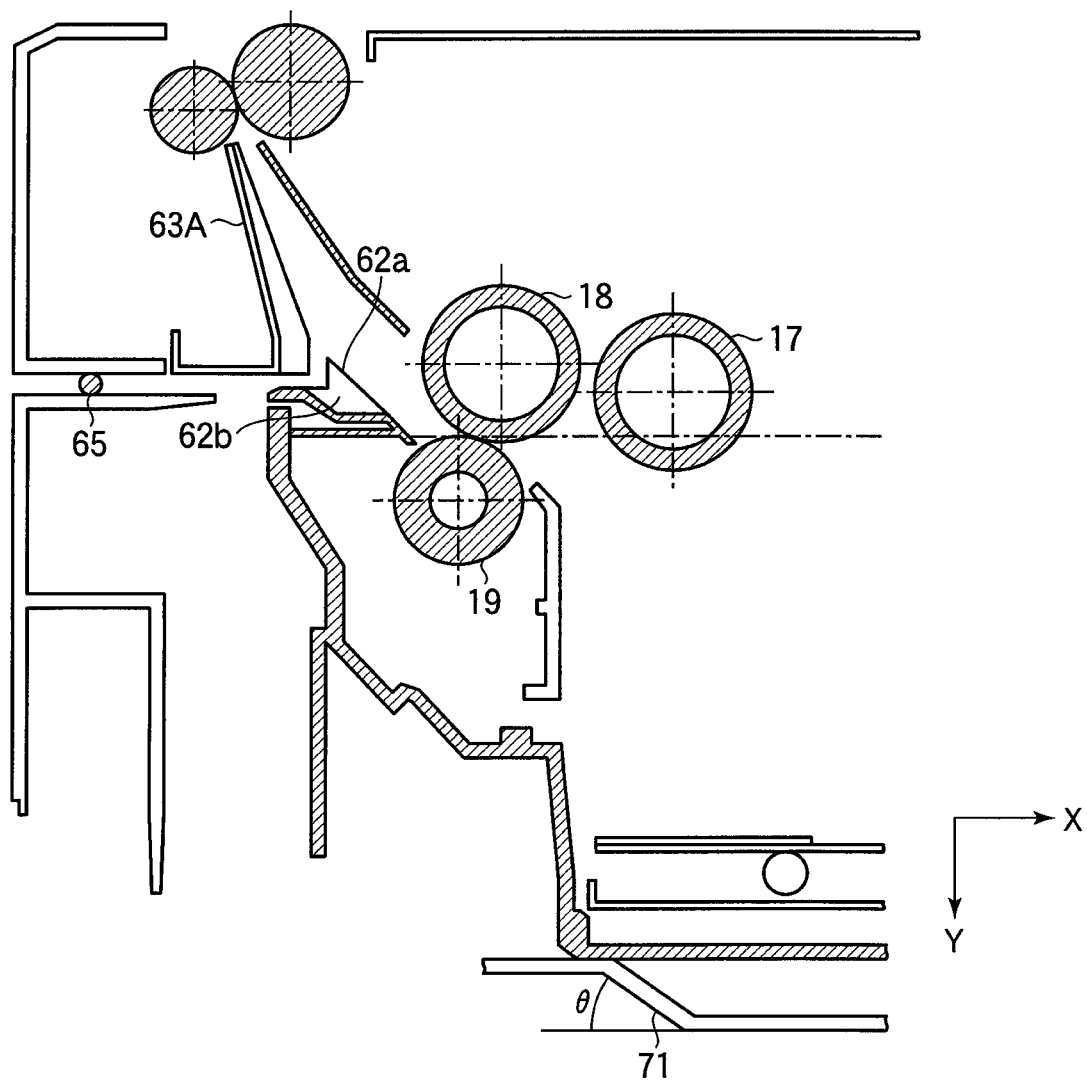
FIG. 17 is a cross-sectional view illustrating a modification to the paper cassette and medium feeding section of the third embodiment.

FIG. 17 is a cross-sectional view illustrating a modification to the paper cassette 11 and medium feeding section 16 of the third embodiment.

A guide 71 having a slope θ is provided for guiding the paper cassette 11. When the paper cassette 11 is pulled in the X direction, the paper cassette 11 is moved along the guide 71. The movement of the paper cassette 11 is resolved into a component in the X direction and a component in a direction shown by arrow Y, so that the paper cassette 11 displaces vertically away from the medium feeding section 16.

Referring to FIG. 16, the guide members 62 formed on the paper cassette 11 includes ribs 62a and recesses 62b. Each of the recesses 62b is defined between adjacent ribs 62a. The guide member 63 includes projections 63a and recesses 63b. Each of the recesses 63b is defined between adjacent projections 63a.

When the paper cassette 11 has been attached to the medium feeding section 16 completely, the guide member 63 and the guide members 61 and 62 cooperatively engage each other such that the projections 63a of the guide 63 are received in the recesses 62b, and such that the guide members 61 and 62 are upstream of the guide member 63 with respect to travel of the medium 12. The guide members 61 and 62 and the guide member 63 are on the same side of the medium 12 that is traveling along the transport path, and the guide members 61 and 62 are upstream of the guide member 63 and are closer to the medium 12 than the guide member 63.

The medium feeding section 16 and the paper cassette 11 are positioned such that the free ends of projections 61a and 62a are closer to a longitudinal middle of the transport path of the medium than the free ends of the projections 63a, i.e., the projections 61a and 62a are closer to the medium than the free ends of the projections 63a, so that the medium is not caught by the joint portions of the medium feeding section 16 and the paper cassette 11 when the medium passes by the overlapping portions.

Referring to FIG. 17, a guide member 63A formed on the medium feeding section 16 does not have a projection such as the projection 63a. In stead, a rib 62a overlaps a lower end portion of the guide member 63A.

The operation of the medium transporting apparatus of the third embodiment will be described.

Figure 18:
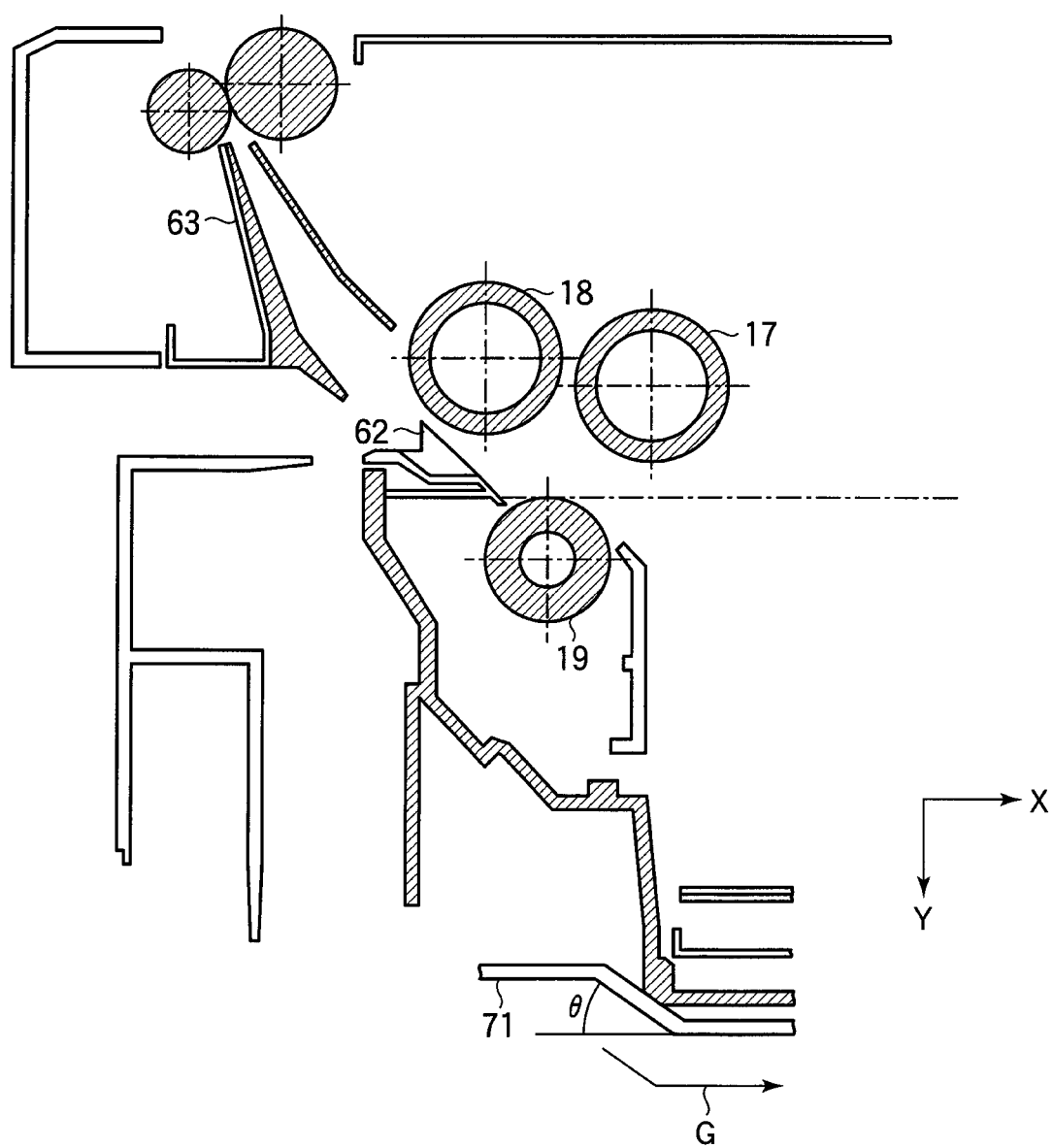
FIG. 18 is a cross-sectional view of the paper cassette and medium feeding section illustrating when the paper cassette has been drawn out of the image forming apparatus.

FIG. 18 is a cross-sectional view of the paper cassette 11 and medium feeding section 16 illustrating when the paper cassette 11 has been drawn out of the image forming apparatus 10.

Figure 19:
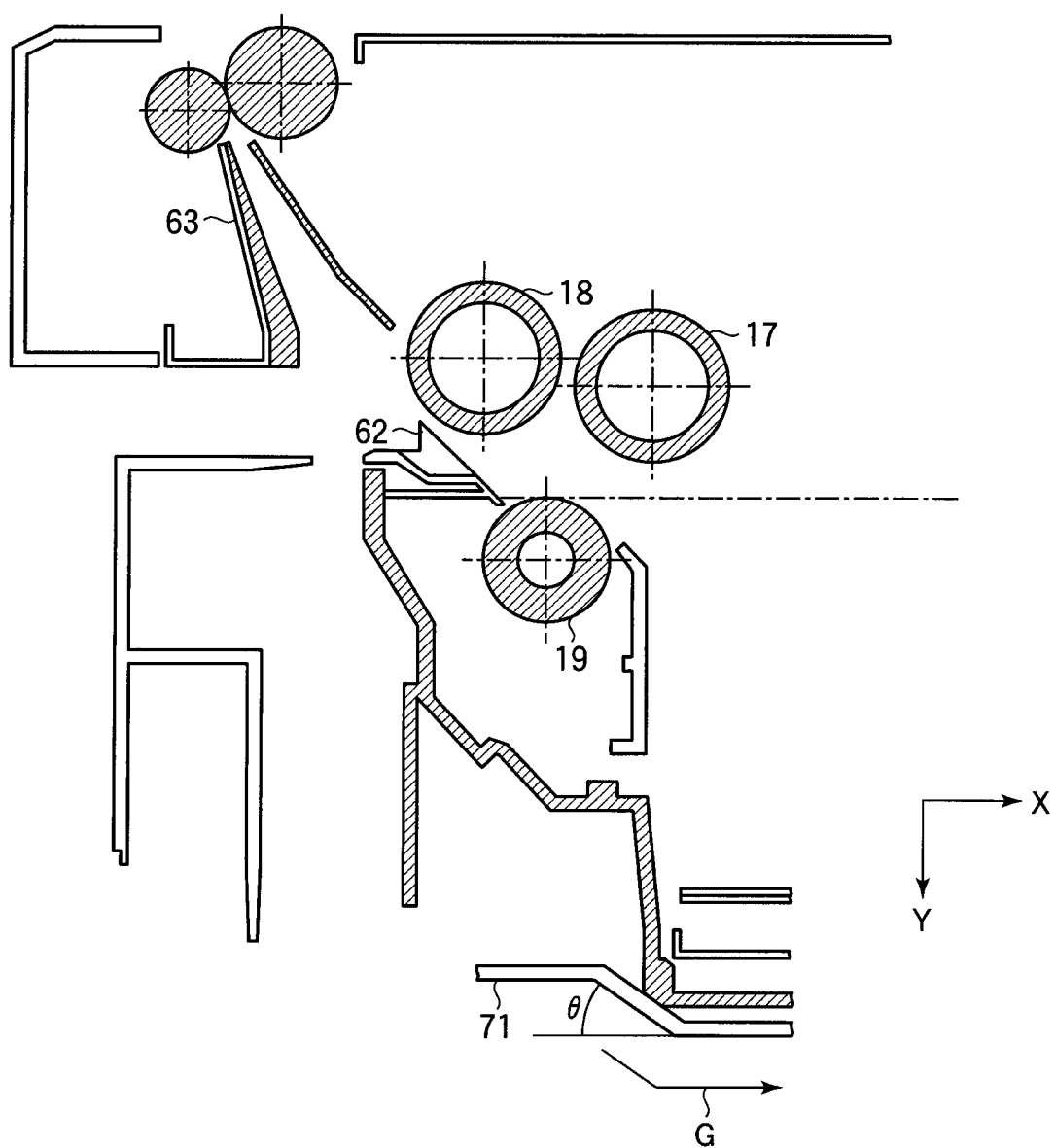
FIG. 19 is a cross-sectional view of the modification to the paper cassette and medium feeding section illustrating when the paper cassette has been drawn out of the image forming apparatus.

FIG. 19 is a cross-sectional view of the modification to the paper cassette 11 and medium feeding section 16 illustrating when the paper cassette 11 has been drawn out of the image forming apparatus 10.

Referring to FIG. 18, when the paper cassette 11 is pulled out in the X direction, the paper cassette 11 is moved in a direction shown by arrow G along the guide 71. The movement of the paper cassette 11 is resolved into a component in the X direction and a component in a direction shown by arrow Y, so that the paper cassette 11 displaces vertically away from the medium feeding section 16. As a result, the paper cassette 11 displaces in the Y direction. Thus, the paper cassette 11 moves away from the guide member 63 without affecting the operation in which the paper cassette 11 is drawn out, so that the guide member 63 and the guide member 62 no longer overlap each other.

In the third embodiment, the guide 71 guides the movement of the paper cassette 11 away from the medium feeding section both horizontally and vertically. This configuration may be effective in increasing the amount of overlapping of the guide member 63 and guide member 62. Further, the configuration provides considerable freedom in the shape of the guide members 62 and 63, making it possible to achieve a smoother guide surface. This structure is effective in preventing the bending and buckling of the medium 12 and in protecting the medium 12 from damage, and improves the ability of the medium feeding section to handle the medium 12.

In the second embodiment, the cutout 62c is required for the guide member 62 to be clear of the projections 63a of the guide member 63. In the third embodiment, the paper cassette 11 moves away from the medium feeding section 16 not only in the horizontal direction but also in the vertical direction. Thus, the guide members 62 and 63 may be formed without any limitation in appearance.

Fourth Embodiment

Elements similar to those of the first to third embodiments haven been given the same reference numerals, and their description is omitted. The description of the operations and advantages of the same elements as the first to third embodiments is also omitted.

Figure 20:
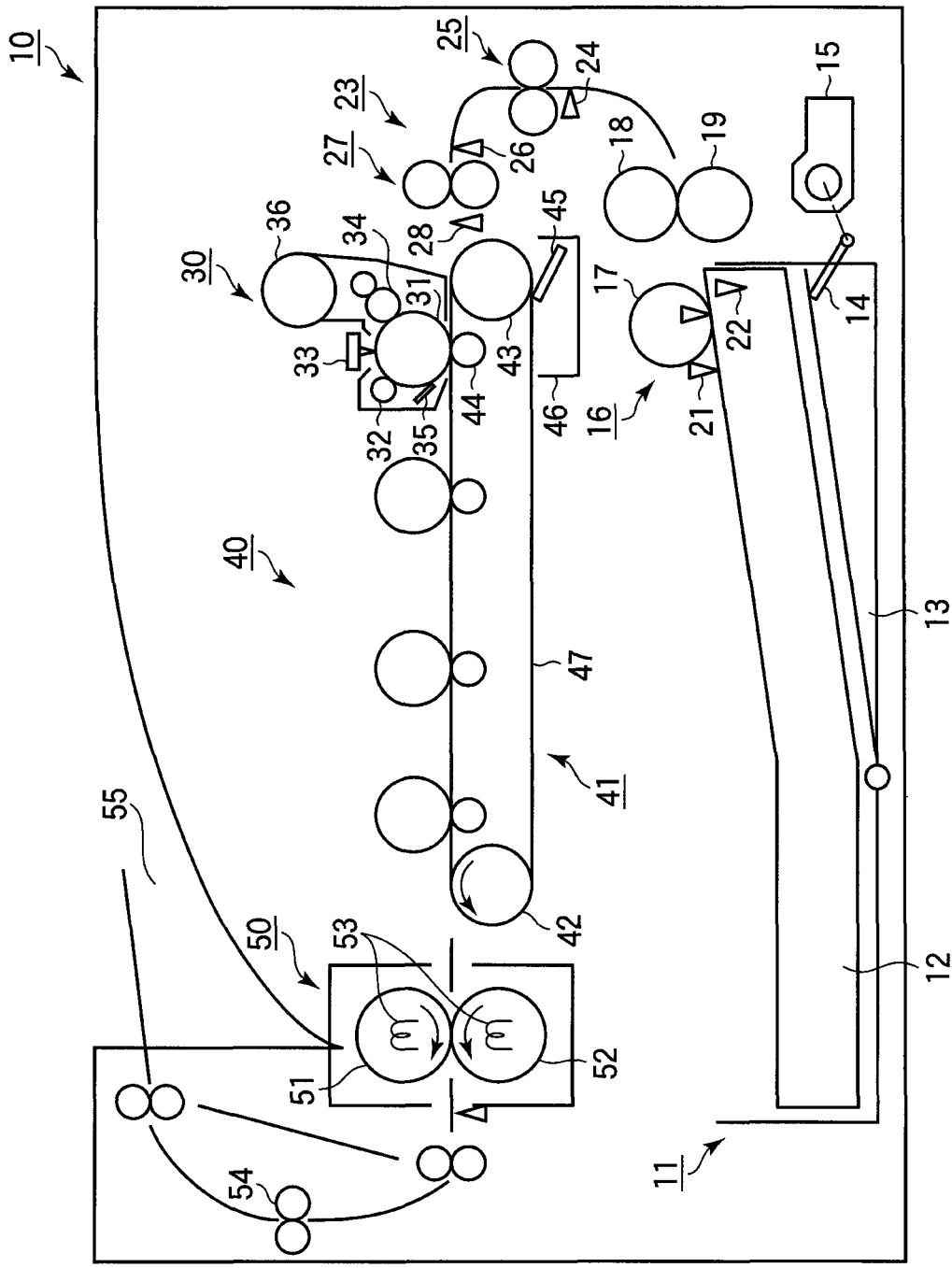
FIG. 20 illustrates a general configuration of an image forming apparatus of a fourth embodiment.

FIG. 20 illustrates a general configuration of an image forming apparatus of a fourth embodiment.

Figure 21:
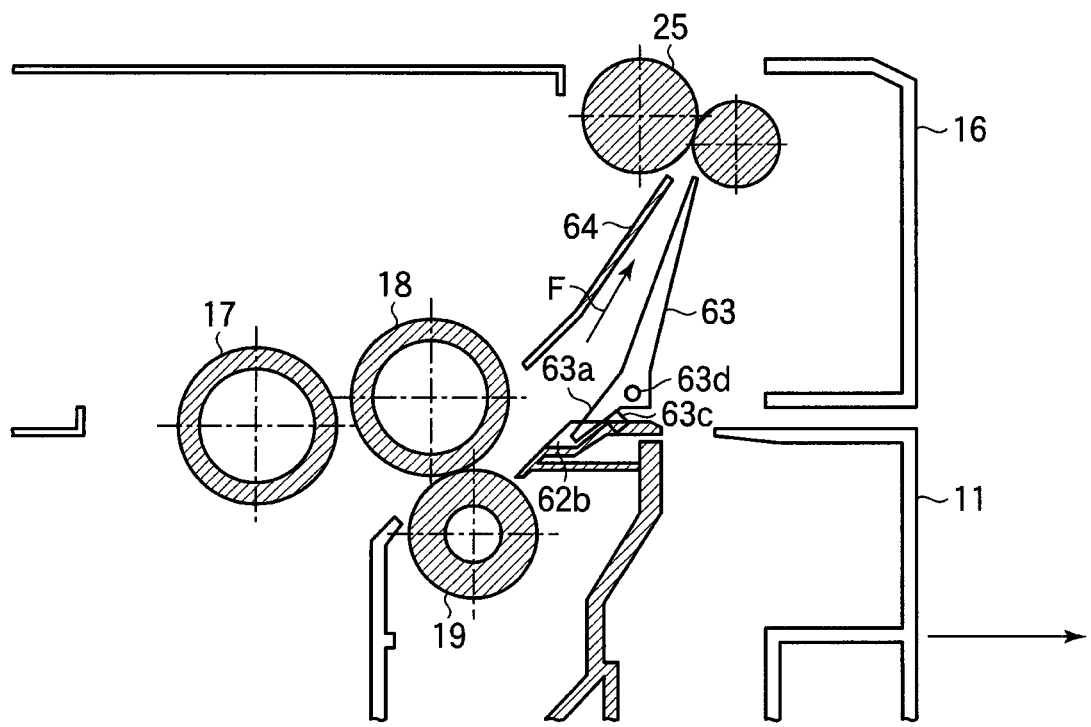
FIG. 21 is a cross-sectional view illustrating a paper cassette and a medium feeding section.

FIG. 21 is a cross-sectional view illustrating a paper cassette 11 and a medium feeding section 16.

In the fourth embodiment, the paper cassette 11 is inserted into and pulled out of the image forming apparatus 10 in directions substantially parallel to the rotational axes of a pick-up roller 17, i.e., in directions perpendicular to the page of FIGS. 20 and 21. Remaining portions of the image forming apparatus 10 are the same as those of the first embodiment, and their description is omitted. If the paper cassette 11 is inserted and drawn out in directions substantially perpendicular to the direction of travel of the medium 12, the image forming apparatus 10 may be of the same configuration as the second embodiment.

In order for the paper cassette 11 to be pulled out of the image forming apparatus 10 in a direction substantially perpendicular to the direction in which the medium 12 is advanced from the paper cassette 11, a mechanism is required for releasing the guide members 61 and 62 formed on the paper cassette 11 and the guide member 63 formed on the medium feeding section 16 from overlapping engagement with each other. For this purpose, the guide member 63 is pivotally supported on a shaft 63d. When the paper cassette 11 has been completely inserted into the image forming apparatus 10, the guide member 63 is held at a position shown in FIG. 21. A projection 63c is formed on the guide member 63, and slides on the guide members 61 and 62 when the paper cassette 11 is pulled out of the image forming apparatus 10. The guide member 63 includes projections 63a and recesses 63b. Each of the recesses 63b is defined between adjacent projections 63a. The projections 63a extend in a longitudinal direction, projecting from the guide member 63 so that the projections 63a resemble comb-like fingers.

The medium feeding section 16 and the paper cassette 11 are positioned such that the free ends of projections 61a and 62a are closer to a longitudinal middle of the transport path of the medium than the free ends of the projections 63a, i.e., the projections 61a and 62a are closer to the medium than the free ends of the projections 63a, so that the medium is not caught by the joint portions of the medium feeding section 16 and the paper cassette 11 when the medium passes by the overlapping portions.

The operation of the medium transporting apparatus of the fourth embodiment will be described.

Figure 22:
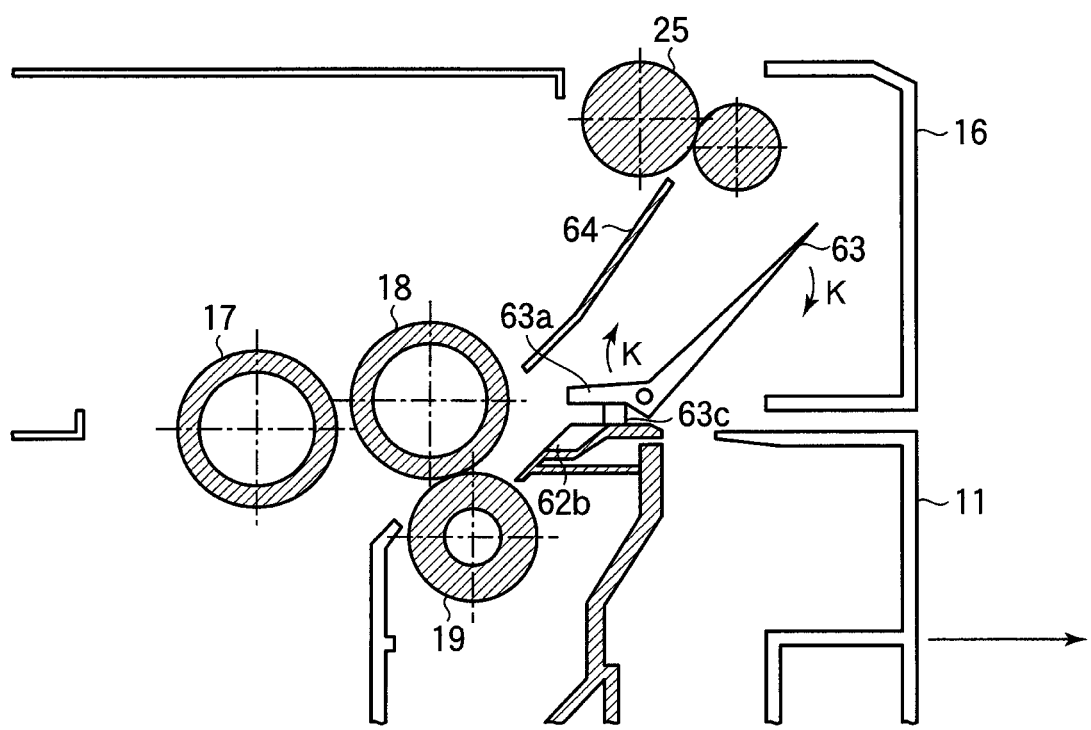
FIG. 22 is a cross-sectional view of the paper cassette and medium feeding section illustrating when the paper cassette has been pulled out of the image forming apparatus.

FIG. 22 is a cross-sectional view of the paper cassette 11 and medium feeding section 16 illustrating when the paper cassette 11 has been pulled out of the image forming apparatus.

In the fourth embodiment, the paper cassette 11 is pulled out of the image forming apparatus in a direction substantially perpendicular to the page of FIG. 22. The guide member 63 is rotatably supported on the shaft 63d. If the paper cassette is pulled toward the viewer, the guide member 63 rotates in a direction shown by arrow K so that the projection 63c slides on the guide members 61 and 62 formed on the paper cassette 11. This causes the guide member 63 to pivot so that the projection 63a moves upward to allow the guide member 63 to move out of overlapping engagement with the guide members 61 and 62. In this manner, the paper cassette 11 may be pulled out of the image forming apparatus 10.

As described above, for the image forming apparatus 10 configured such that the paper cassette 11 is pulled out in a direction perpendicular to the direction in which the medium is advanced from the paper cassette 11, once the paper cassette 11 has been completely inserted, the projections 63a of the guide member 63 may be received in the recesses 61b or 62b such that the guide member 63 overlaps the guide members 61 and 62. This configuration allows the joint portion between the guide member 63 and the guide members 61 and 62 to be hidden, providing smooth medium transportation as well as preventing bending and buckling of the medium 12 and protecting the medium 12 from damage during transportation of the medium 12 in the image forming apparatus.

Fifth Embodiment

Elements similar to those of the first to fourth embodiments haven given the same reference numerals and their description is omitted. The description of the operations and advantages of the same elements as the first to fourth embodiments is also omitted.

Figure 23:
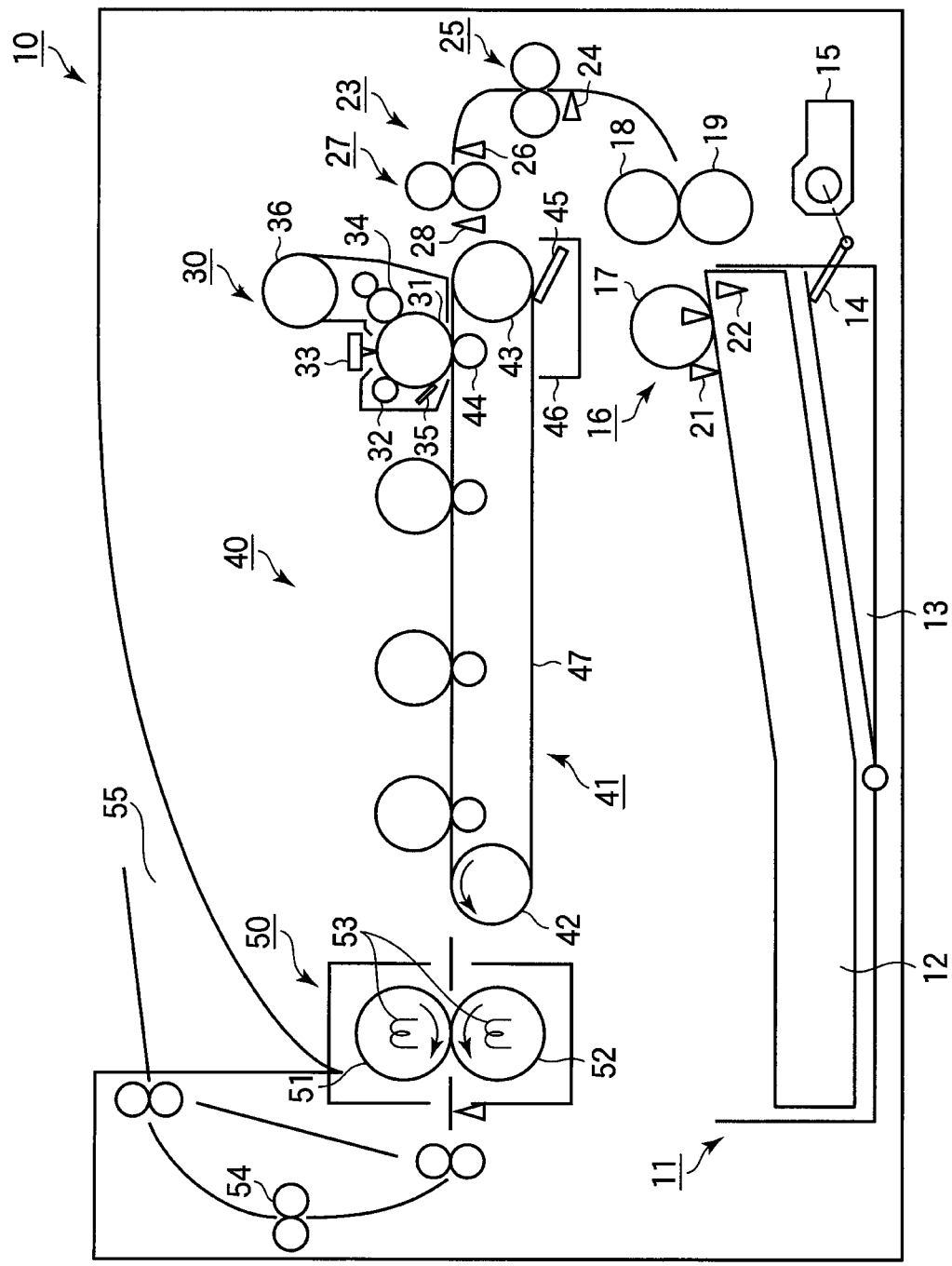
FIG. 23 illustrates the general configuration of an image forming apparatus of a fifth embodiment.

FIG. 23 illustrates the general configuration of an image forming apparatus 10 of a fifth embodiment.

In the fifth embodiment, a fixing section 50 may be in the form of a unit construction that may be replaced by a user without difficulty. The fixing section 50 may be raised and lowered to be loaded into and unloaded from the image forming apparatus 10. Remaining portions of the image forming apparatus 10 are the same as those of the first embodiment, and their description is omitted.

The fixing section 50 and a discharging section 77 both of which function as part of the medium feeding apparatus 16 will be described in detail.

Figure 24:
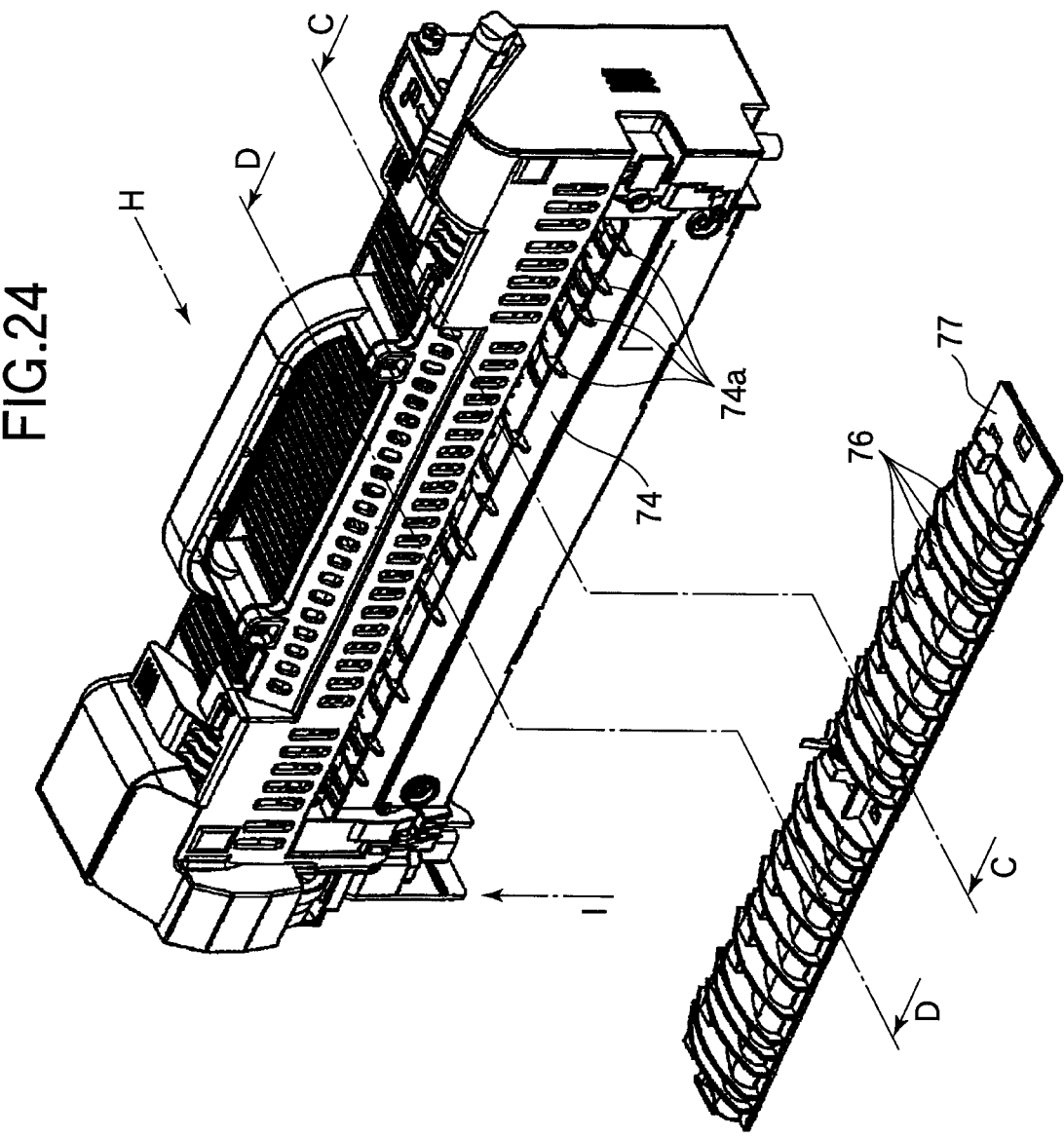
FIG. 24 is an exploded perspective view illustrating the fixing section and discharging section of the fifth embodiment.

FIG. 24 is an exploded perspective view illustrating the fixing section and discharging section of the fifth embodiment.

Figure 25:
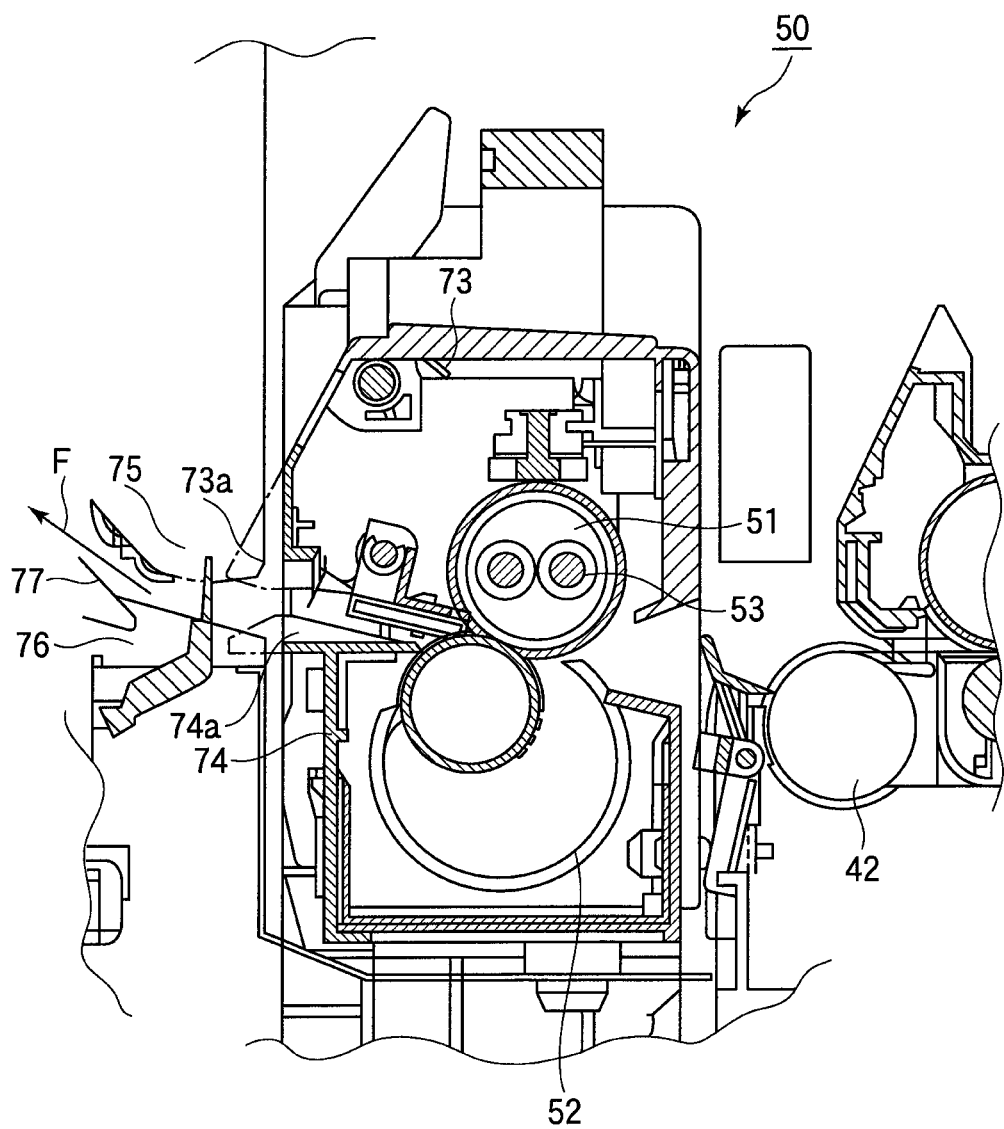
FIG. 25 is a cross-sectional view taken along a line C-C of FIG. 24, illustrating the fixing section and discharging section.

FIG. 25 is a cross-sectional view taken along a line C-C of FIG. 24, illustrating the fixing section and discharging section.

Figure 26:
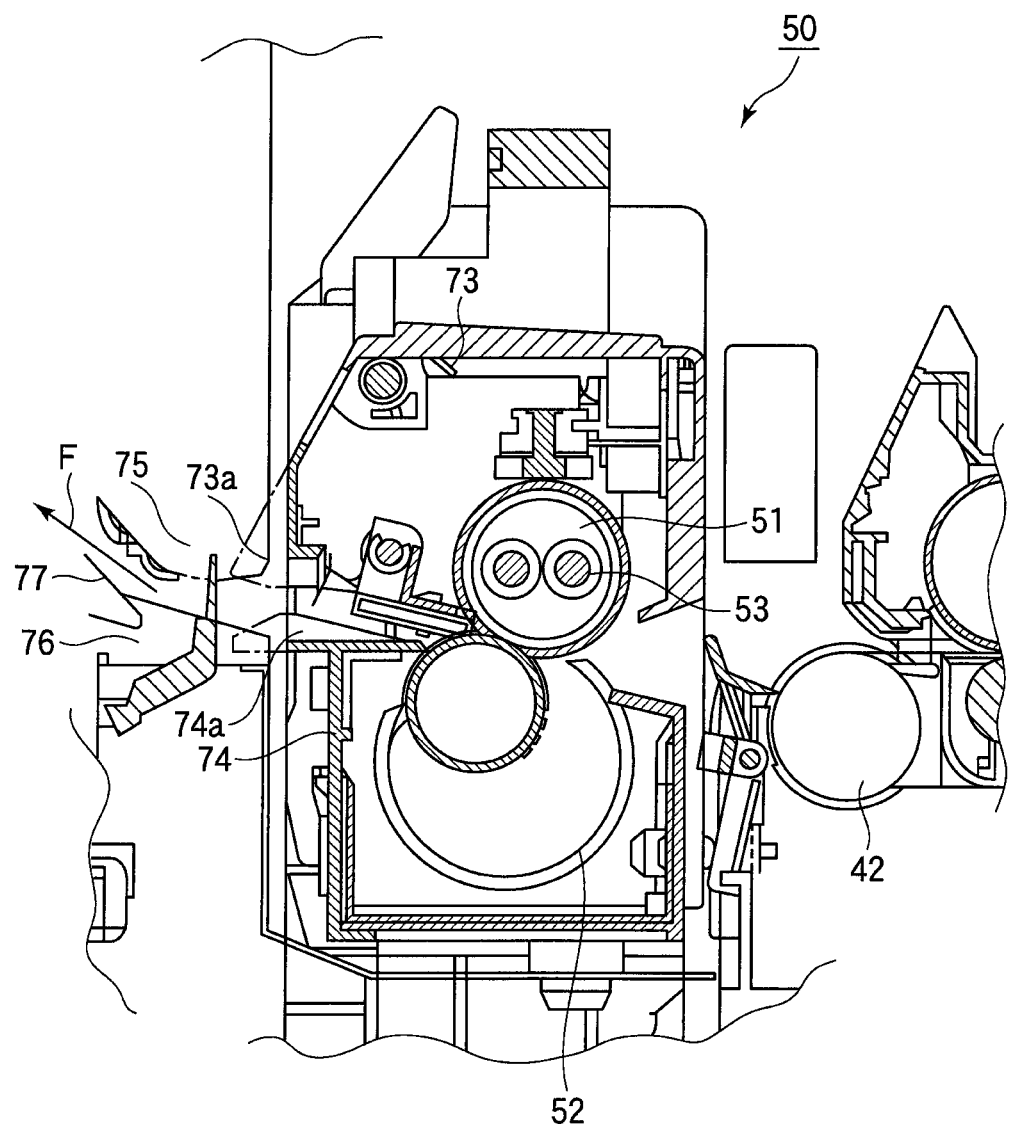
FIG. 26 is a cross-sectional view taken along a line D-D of FIG. 24, illustrating the fixing section and discharging section.

FIG. 26 is a cross-sectional view taken along a line D-D of FIG. 24, illustrating the fixing section and discharging section.

Referring to FIGS. 25 and 26, the fixing section 50 includes an upper roller 51 covered with an upper cover 73 and a lower roller 52 covered with a lower cover 74. The upper cover 73 and lower cover 74 cooperate with each other to discharge the medium 12 when the medium leaves a fixing point defined between the upper roller 51 and lower roller 52. An arrow H represents a direction of travel of the medium 12 and an arrow I indicates a direction in which the fixing section 50 is raised from and lowered into the image forming apparatus 10.

In the fifth embodiment, the fixing section 50 is an easy-to-replace unit. The upper cover 73 includes ribs 73a that serve as a guide. The lower cover 74 includes ribs or a second projection 74a that serves as a guide. The upper cover 73 overlaps the discharging section 77. The ribs 73a and 74a are disposed at predetermined intervals. Each of the ribs or second projection 74a includes a first guide surface 74b and a second guide surface 74c. The second guide surface 74c is disposed downstream of the first guide surface 74b with respect to the second direction in which the medium is transported. The first guide surface 74b and second guide surface 74c meet such that the first guide surface 74b and the second guide surface 74c form a generally convex surface. The discharging section 77 includes an upper guide member 75 and a lower guide member 78. The upper guide member 75 and lower guide member 78 cooperate with each other to define a transport path F. The upper guide member 75 includes recesses and cutouts formed at the same intervals as the ribs 73a and the ribs or second projection 74a that resemble comb fingers. The lower guide member 78 includes ribs 76 (FIG. 24) or a first projection. Once the fixing section 50 has been attached into the image forming apparatus 10, the ribs 73a are received in the cutouts of the upper guide member 75, and the ribs or second projection 74a are received in the recesses defined between adjacent ribs 76. The upper guide member 75 includes the recesses and cutouts so that when the fixing section 50 is lowered into or raised from the image forming apparatus 10, the ribs or first projection 73a will not interfere with the upper guide 75. The lower guide member 78 includes recesses defined between adjacent ribs 76 so that when the fixing section 50 is lowered into or raised from the image forming apparatus 10, the ribs or second projection 74a will not interfere with the ribs 76 of the lower guide member 78.

The operation of the medium transporting apparatus of the fifth embodiment will be described.

The fixing section 50 includes the upper roller 51 and lower roller 52 that define the fixing point therebetween. When the medium 12 passes through the fixing point, the toner image on the medium 12 is fixed by heat and pressure. Due to the heat and pressure applied to the medium 12, the medium 12 is apt to be concavely curved. This is particularly true for soft, thin, and easy-to-buckle paper, for example, when thin paper is advanced with the paper oriented such that the cross direction of the paper substantially parallel to the direction of travel of the paper. As a result, the sheet of medium 12 may be trapped or caught by a joint portion between the fixing section 50 and the discharging section 77 or may be jammed.

As described above, the fixing section 50 includes the upper cover 73 and lower cover 74. The joint portion between the upper cover 73 and the guide member 75 is covered with the ribs 73a. The joint portion between the lower cover 74 and the lower guide member 78 is covered with the ribs or second projection 74a. The guide member 75 and 78 define a transport path therebetween through which the medium 12 is smoothly transported to the discharging roller pair 54.

As described above, image forming apparatus 10 of the fifth embodiment incorporates the fixing section 50 that is lowered and raised in directions perpendicular to the direction of travel of the medium 12. The ribs 73a are adjacent to and interdigitated between the guide members 75 so that the upper cover 73 overlaps the discharging section 77, and the ribs or second projection 74a are adjacent to and interdigitated between the ribs or first projection 10 section 77. Thus, the joint portions between the fixing section 50 and the discharging section 77 are hidden or covered, thereby providing a guide surface for smooth advancement of the medium 12. This ensures that not only the ordinary paper but also soft, thin medium is free from buckling, bending, and damage, and improves the ability of the medium transporting apparatus to handle the medium 12. For example, even when paper is advanced with the cross direction of the paper substantially parallel to the direction of travel of the paper, the aforementioned guide surface facilitates smooth advancement of the medium 12.

The present invention has been described in terms of a medium transporting apparatus incorporated in an electrophotographic printer. The invention may also be applicable to other image forming apparatuses that employs electrophotographic technology, such as copying machines, facsimile machines, and printers. While the paper cassette and fixing section of the fifth embodiment have been described as a detachably attached unit, the medium transporting apparatus of the invention may also be applied to a fixing unit, a duplex unit, and an option paper cassette which are all detachably attached to the image forming apparatus.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An image forming apparatus, comprising:
    a first medium guide member disposed in a first transport path in which a medium is transported, the first medium guide member being part of a body of the image forming apparatus and including a first base portion and at least one first projection that projects from the first base portion; and
    a second medium guide member disposed in a second transport path, the second medium guide member being detachably attached to the body and including a second base portion and at least one second projection that projects from the second base portion;
    wherein the first projection and the second projection overlap each other such that overlapping portions of the first projection and the second projection are aligned side-by-side in a first direction substantially perpendicular to a second direction in which the medium is transported.

2. The image forming apparatus according to claim 1, wherein when the second medium guide member has been attached to the body, the first projection extends from the first medium guide member to the second medium guide member.

3. The image forming apparatus according to claim 1, wherein when the second medium guide member has been attached to the body, the second projection extends from the second medium guide member to the first medium guide member.

4. The image forming apparatus according to claim 1, wherein the first projection and the second projection extend to cover an area between the first transport path and the second transport path, thereby preventing the medium from entering the area between the first medium guide member and the second medium guide member.

5. The image forming apparatus according to claim 1, wherein the first projection is one of a plurality of first projections and the second projection is one of a plurality of second projections, the first projections and the second projections are disposed such that a portion of one of the first projections is between two adjacent second projections and a portion of one of the second projections is between two adjacent first projections.

6. The image forming apparatus according to claim 1, wherein the second medium guide member is disposed on a medium cassette detachably attached to the body.

7. The image forming apparatus according to claim 1, wherein the second medium guide member is disposed on a fixing unit detachably attached to the body.

8. The image forming apparatus according to claim 1, wherein the second medium guide member is disposed on an inverter for inverting a direction of travel of the medium during duplex printing, the inverter being detachably attached to the body.

9. The image forming apparatus according to claim 1, wherein the second medium guide member is disposed on an option paper cassette detachably attached to the body.

10. The image forming apparatus according to claim 1 further comprising:
    an image forming section configured to form a developer image on the medium;
    a fixing unit detachably attached to the body by a user, the fixing unit including the second medium guide member, a first rotatable body, a second rotatable body in pressure contact with the first rotatable body, and a heat source, wherein when the medium carrying the developer image thereon passes through a contact area between the first rotatable body and the second rotatable body, the developer image is fixed into the medium by heat and pressure;
    a discharging section including a discharging roller and the first medium guide member, the discharging section being configured to discharge the medium after fixing to the outside of the image forming apparatus;
    wherein the second medium guide member guides the medium after fixing to the first medium guide member and the first medium guide member guides the medium to the discharging roller;
    wherein the first projection is one of a plurality of first projections and the second projection is one of a plurality of second projections, the first projections are aligned in the first direction and the second projections are aligned in the first direction, the first projections being adjacent to and interdigitated between the second projections.

11. The image forming apparatus according to claim 1, wherein the second projection is one of a plurality of second projections and each of the plurality of second projections includes a plurality of ribs.

12. The image forming apparatus according to claim 1, wherein the second projection includes a first guide surface and a second guide surface disposed downstream of the first guide surface with respect to the second direction in which the medium is transported, the first guide surface and the second guide surface meeting such that the first guide surface and the second guide surface define a generally convex surface.

13. A unit removably attachable to a body of an image forming apparatus including a first medium guide member disposed in a first transport path in which a medium is transported, the first medium guide member including a first base and at least one first projection that projects from the first base, the unit comprising:
    a second medium guide member disposed in a second transport path in which the medium is transported, the second medium guide member including a second base and at least one second projection that projects from the second base;
    wherein when the unit has been attached to the body, the first projection and the second projection overlap each other such that overlapping portions of the first projection and the second projection are aligned side by side in a first direction substantially perpendicular to a second direction in which the medium is transported.

14. The unit according to claim 13, wherein when the unit has been attached to the body, the second projection extends from the second medium guide member to the first medium guide member.

15. The unit according to claim 13, wherein the first projection and the second projection extend to cover an area between the first transport path and the second transport path, thereby preventing the medium from entering the area between the first medium guide member and the second medium guide member.

16. The unit according to claim 13, wherein the first projection is one of a plurality of first projections aligned in the first direction and the second projection is one of a plurality of second projections aligned in the first direction;
    wherein when the unit has been attached to the body, the first projections and the second projections are disposed such that a portion of one of the first projections is between two adjacent second projections and a portion of one of the second projections is between two adjacent first projections.

17. The unit according to claim 13, wherein the unit is a medium cassette that holds a medium therein.

18. The unit according to claim 13, wherein the unit is a fixing unit that fixes an image on the medium.

19. The unit according to claim 13, wherein the second projection is one of a plurality of second projections and each of the plurality of second projections includes a plurality of ribs.

20. The unit according to claim 13, wherein the second projection includes a first guide surface and a second guide surface disposed downstream of the first guide surface with respect to the second direction in which the medium is transported, the first guide surface and the second guide surface meeting such that the first guide surface and the second guide surface define a generally convex surface.

* * * * *